US012711468B2

(12) United States Patent
Zahavi et al.

(10) Patent No.: US 12,711,468 B2
(45) Date of Patent: Aug. 18, 2026

(54) SYSTEMS AND METHODS TO GENERATE AN ENRICHED MEETING PLAYBACK TIMELINE

(71) Applicant: MICROSOFT TECHNOLOGY LICENSING, LLC, Redmond, WA (US)

(72) Inventors: Yoram Zahavi, Zichron Yaacov (IL); Michael Shterenberg, Petah Tikva (IL); Adi L. Miller, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 507 days.

(21) Appl. No.: 17/857,652

(22) Filed: Jul. 5, 2022

(65) Prior Publication Data

US 2024/0013158 A1 Jan. 11, 2024

(51) Int. Cl.

*G06F 3/0482* (2013.01)
*G06F 3/0484* (2022.01)
*G06F 40/169* (2020.01)
*G06F 40/279* (2020.01)
*G06F 40/284* (2020.01)
(Continued)

(52) U.S. Cl.

CPC ....... *G06Q 10/1093* (2013.01); *G06F 3/0482* (2013.01); *G06F 3/0484* (2013.01); *G06F 40/169* (2020.01); *G06F 40/279* (2020.01); *G06F 40/30* (2020.01); *G10L 17/06* (2013.01)

(58) Field of Classification Search

CPC . G06Q 10/1095; G06F 3/0482; G06F 3/0484; G06F 40/169; G06F 40/279; G06F 40/30; G06F 16/489; G06F 40/284; G10L 17/06; H04N 7/15

See application file for complete search history.

(56) References Cited

U.S. PATENT DOCUMENTS 7,466,334 B1 12/2008 Baba
10,630,740 B2 * 4/2020 Rodriguez .......... H04L 65/4015
(Continued)

OTHER PUBLICATIONS

"International Search Report and Written Opinion Issued in PCT Application No. PCT/US23/022622", Mailed Date: Aug. 18, 2023, 11 Pages.

*Primary Examiner* — Hai Phan
*Assistant Examiner* — Ian Scott Mclean

(57) ABSTRACT

Technology is disclosed for programmatically determining an event of interest that is specific to a user, and generating, based on user-meeting data, an enriched playback timeline that includes the event of interest on a graphical user interface (GUI). To determine the event of interest, this disclosure provides technologies to determine one or more meeting data features based on meeting data associated with a meeting. Based on the one or more meeting data features, this disclosure includes determining an event of interest. The event of interest may include, for example, an indication of whether a person was mentioned, an indication of whether a question was asked, an indication of whether a keyword was mentioned, an indication of whether a topic was covered, and so forth. From these events of interest, a GUI that includes an enriched meeting playback timeline that includes an indication of the event of interest may be generated.

21 Claims, 10 Drawing Sheets

(51) Int. Cl.

| | |
|---|---|
| ***G06F 40/30*** | (2020.01) |
| ***G06Q 10/1093*** | (2023.01) |
| ***G10L 17/06*** | (2013.01) |
| ***H04N 7/15*** | (2006.01) |

(56) References Cited

U.S. PATENT DOCUMENTS

| | | | | |
|---|---|---|---|---|
| 2004/0169683 | A1 | 9/2004 | Chiu et al. | |
| 2011/0021250 | A1 | 1/2011 | Ickman et al. | |
| 2013/0325972 | A1* | 12/2013 | Boston | G06Q 10/10<br>709/204 |
| 2019/0236547 | A1* | 8/2019 | Huang | H04L 65/4015 |
| 2020/0227043 | A1* | 7/2020 | Badr | G10L 15/22 |
| 2020/0403817 | A1* | 12/2020 | Daredia | G10L 15/083 |
| 2023/0223016 | A1* | 7/2023 | Konam | G06F 40/284<br>704/231 |
| 2023/0260520 | A1* | 8/2023 | Medalion | H04L 12/1831<br>704/232 |

* cited by examiner

SYSTEMS AND METHODS TO GENERATE AN ENRICHED MEETING PLAYBACK TIMELINE

BACKGROUND

People spend a significant amount of their time in meetings, presentations, and lectures, such as for school or for work. Moreover, people are attending more meetings more often, as they are working remotely more often and thus have less unplanned interactions with coworkers, often communicating with others via meeting applications including time collaborating or working with teams or groups of people. Often meetings overlap or particular projects or courses may involve multiple meetings or presentations. Consequently, people are spending increasing amounts of time listening to meeting recordings, reviewing their meeting notes, and catching up on missed meetings or important content that they missed while attending a meeting.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for improving the functionality of multimedia content generated or presented by computing applications accessible on user computing devices (sometimes referred to herein as mobile devices, laptops, desktops, computers, virtual-reality (VR) headsets, or user devices). In particular, this disclosure provides technologies to programmatically determine, from presentation or meeting-related content, an event of interest that is specific to a user, and generate, based on user-meeting data, an enriched playback timeline that includes the event of interest presented on a graphical user interface (GUI). To determine the event of interest, this disclosure provides technologies to determine one or more meeting data features based on user-meeting data associated with a meeting. By way of example and without limitation, the meeting data features include features indicative of, among other measurable properties, an identity of a speaker in the meeting recording, a verbal command uttered during a meeting or while watching the meeting recording, transcript content, chat content, a duration of a speaker, a duration of the meeting, a duration of pauses, a user annotation, a user input into a chat, and/or contextual metadata expressed as data features indicative of meeting invitees, meeting attendees, a type of meeting, and the like. Based on the one or more meeting data features, this disclosure provides technologies to determine an event of interest. The event of interest includes, for example, an indication of whether a person was mentioned, an indication of a speaker presenting content during the meeting, an indication of whether a question was asked, an indication of whether a keyword was mentioned, an indication of whether a topic was covered, and/or any other content that is relevant to the viewer or the particular meeting recording.

In some embodiments, the operation of a computer application, such as a communications or video hosting application, is configured or modified to execute computer instructions for presenting a GUI that includes an enriched meeting playback timeline that includes an indication of the event of interest. For example, in an embodiment, the enriched meeting playback timeline includes a visually distinct indicator (such as a color-coded indicator) or segment for each event of interest, such as speaker, topic, and the like. The enriched meeting playback timeline may include an indication, such as an icon, a text bubble, a segment, an alphanumeric symbol, and emoji, and the like, for each type of event of interest. In some embodiments, the GUI includes at least one toggle control that is selectable to expand the enriched meeting playback timeline. For example, selection of the toggle control causes execution of computer instructions to modify content on the GUI and present a plurality of enriched meeting playback sub-timelines, each sub-timeline corresponding to an event of interest, such as speaker of the meeting or each sub-timeline corresponding to a topic of the meeting. Indeed, the plurality of enriched meeting playback sub-timelines may share (for example, also include) information included in the enriched meeting playback timeline that has been indexed based on an event of interest, such as speaker or topic. For example, the plurality of enriched meeting playback sub-timelines include the events of interest on respective sub-timelines that were spoken by different speakers or that include different topics. Such technologies improve the user experience in any of a number of computer applications and platforms. Further, these technologies reduce computational resources associated with a user causing unnecessary playback in an effort to manually find relevant content.

BRIEF DESCRIPTION OF THE DRAWINGS

Aspects of the disclosure are described in detail below with reference to the attached drawing figures, wherein.

DETAILED DESCRIPTION

Figure 1:
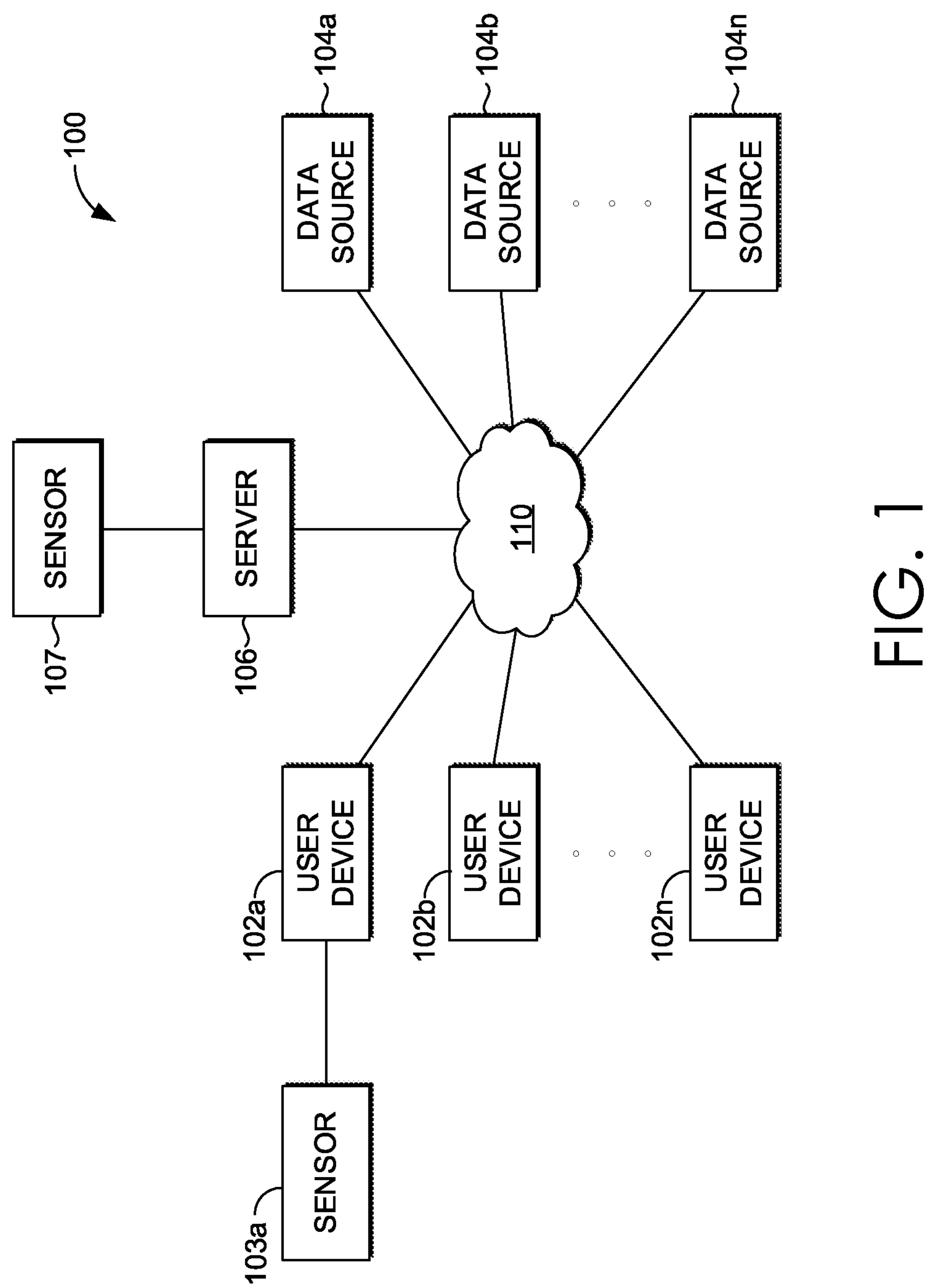
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process that may be performed using any combination of hardware, firmware, and/or software. For example, various functions are carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic communication technology and enhanced computing services for a user, to improve the generation of meeting-recorded content and tools for improving the information that is retrieved by a viewer of the meeting recording. In particular, the solutions provided herein include technologies to programmatically (1) determine an event of interest that is specific to a user and a meeting, and (2) generate, based on user-meeting data and present via a graphical user interface (GUI), an enriched playback timeline that includes the events of interest. In an example, the "event of interest" refers to an instance or duration of time during the meeting recording when information that is of importance or of interest to a viewer is being presented.

In an example, as used herein, "meeting" refers to a gathering of one or more people that is at least partially hosted or supported by a computing application operating on a computing device, such as a meeting application, video conferencing application, or collaboration application, and for which a user may interact by way of their client computing device. In one example, the meeting includes a hybrid meeting where a portion of attendees are participating in-person, while another portion of attendees are participating via a client computing device as discussed above. For example, a meeting allows for meeting attendees to engage with each other or deliver content to other attendees at or near real-time. Computer application software supporting meetings may also support additional features, such as a chat, a recording control, and so forth. On the other hand, "meeting recording," as used herein in an example, refers to a record of at least an aspect or portion of a meeting, such as an audio, video, or multimedia recording of a meeting. For example, a meeting recording corresponds to a stored copy of a meeting that has already occurred.

By way of a non-limiting example, a student viewing a meeting recording, such as a lecture by a graduate student lecturer, may want to easily access information relevant to an upcoming exam, while a university administrator (who is tasked with evaluating the lecturer) watching that same video may want to access information indicative of questions being asked in class to determine the lecturer's competency in answering student questions. In this example, an event of interest for the student includes every mention of a keyword, such as "exam", "test", "final", or "midterm", while an event of interest for the university administrator includes every instance that a question is asked by someone other than the speaker. Accordingly, the event of interest may be personalized or user-specific. In some embodiments, the event of interest is determined based on a user profile defining user-meeting data, user settings/configurations, and the like.

To determine an event of interest, this disclosure provides technologies to determine one or more meeting data features based on user-meeting data associated with a meeting. Additionally, aspects of the present disclosure relate to technology for employing a computer application, such as a communications or video hosting application, configured or modified to execute computer instructions for presenting a graphical user interface (GUI) comprising an enriched meeting playback timeline that includes the event of interest, which, in one embodiment, are specific to the viewer of the meeting recording. The enriched meeting playback timeline may include a visually distinct indicator (such as a color-coded indicator) or segment for each event of interest, such as speaker, topic, and the like. The enriched meeting playback timeline may include an indication, such as an icon, a text bubble a segment, an alpha-numeric symbol, and emoji, and the like, for each type of event of interest. For example, when a question being asked is determined to be an event of interest, the enriched meeting playback timeline includes a question emoji or symbol ("?") corresponding to an instance in time during the meeting-video when a question was mentioned.

In the context of an education lecture, a segment during which the professor was speaking may be shown on the enriched meeting playback timeline as a red color, while a segment during which students were speaking (for example, presenting their midterm projects) may be shown on the enriched meeting playback timeline as a green color. In one embodiment, a computing system generates an indication of the event of interest (for example, the question symbol or emoji indicative of a question being asked) for each instance a question was asked by the professor on the red colored segment of the enriched meeting playback timeline and/or by the student on the green colored segment of the enriched meeting playback timeline.

In some embodiments, the GUI provides at least one view toggle control selectable to expand the enriched meeting playback timeline. For example, selection of the view toggle control causes execution of computer instructions to present a plurality of enriched meeting playback sub-timeline corresponding to the enriched meeting playback timeline. Each sub-timeline may be indexed based on an event of interest. Continuing the example above of a college lecture, the sub-timelines are indexed based on any event of interest, such as a type of speaker. In this manner, each sub-timeline may include the segments associated with a corresponding speaker. For example, the sub-timelines includes a first enriched meeting playback sub-timeline having the red colored segments during which the professor was speaking, and includes a second enriched meeting playback sub-timeline having the green colored segments during which a student was speaking. The sub-timelines may include additional events of interest, such as questions spoken, keywords identified, and so forth, that are associated with the corresponding speaker.

In one embodiment, the event of interest is generated based on the meeting data features that are generated based on user-meeting data, such as a transcript of the meeting recording, a chat of the meeting recording, spoken words by the user, or commands entered by the user during re-watching the meeting recording, or in real-time while attending the meeting. In the context of a manual user input, for example, a user inputs a command of alphanumeric characters, such as pound and a question mark (for example, "#?") to associate the instance in time during which the command was input with an event of interest, in this example, a question being asked. Alternatively or additionally, the command input by the user may include a menu selection and/or words spoken by the user. Alternatively or additionally, user commands may be omitted such that the event of interest is automatically generated, for example, based on user preferences and without a user input while the meeting recording is being viewed or while the meeting is being attended.

In some embodiments, the event of interest is ranked based on the user profile and the meeting-data. The enriched meeting playback timeline may limit the number of events of interest that are generated on the enriched meeting playback timeline. For example, the computer application that presents the enriched meeting playback timeline is running on a mobile device, such that less screen space accommodates less events of interest than when the computer application is running on a desktop or laptop device. Accordingly, the enriched meeting playback timeline may include less events of interest when generated on a mobile device than when generated on a laptop or desktop device. In one embodiment, the mobile device causes presentation of only the top ranked n-number of events of interest, where n is a real integer such as 1, 2, 3, 4 and so forth. In some embodiments, an order of the enriched meeting playback sub-timelines is based on the ranking.

Such technologies improve the user experience in any of a number of computer applications and platforms and reduce computational resources associated with a user causing unnecessary playback in an effort to manually find relevant content. Instead, the embodiments disclosed herein improve the ability for a user to efficiently watch or re-watch a meeting recording without having to blindly navigate to different portions of the meeting recording without an indication of whether the different portions of the meeting recording will be relevant to the user. As such, network bandwidth associated with streaming meeting recordings may be saved and reallocated to other uses since the embodiments described herein point users to events of interest and allow for easy navigation via the enriched meeting playback timeline and/or the enriched meeting playback sub-timeline.

Overview of Technical Problems, Technical Solutions, and Technological Improvements As previously described, people spend significant time communicating with and in meetings with other people, including time collaborating or working in teams, and it can be helpful for a user to have a timeline with enriched information. For example, when a user has a meeting with or communicates with a team, it would be helpful to provide the user with tools for playing back the meeting recording in such a manner that enriched information is presented on one or more timelines. Similarly, it can be helpful for new employees or users to customize the timeline either while attending the meeting or while watching a meeting recording of the meeting.

However, as anyone who has ever listened to recorded meetings can attest, it is a time consuming and inefficient process, especially where a user is only interested in reviewing certain information but must listen to entire meetings because they do not know where to focus their attention on their review. In particular, existing conventional technologies lack computing functionality to determine and provide user-meeting data that is relevant or of interest to the user, nor does there exist computing functionality to empower viewers to customize the meeting-recording content to improve user computing experiences. Additionally, many conventional technologies lack computing functionality to programmatically determine and provide relevant data on a timeline, nor does there exist computing functionality to empower viewers to customize the relevant data presented on the timeline to improve user computing experiences. In particular, existing approaches provide a timeline corresponding to content being streamed, such that the timeline provides an indication, such as a timer corresponding to a time stamp of content being presented on a video. For example, a viewer views a video, during which the timing indication moves from left to right, where at the start of the video the timing indication is on the left and at the end of the video the timing indication is on the right. At most, the functionality associated with this approach includes allowing a user to toggle to a corresponding time in the video, for example, to 3 minutes from the start of a video. Unfortunately, this existing approach fails to provide any meaningful data beyond data indicative of a time stamp from the start of the meeting associated with content being presented to facilitate finding a portion of the meeting recording.

Therefore, a user is instead left to manually watch the entire video, and make manual notes of times of the video that may correspond to events of interest. Further compounding this problem, many companies and organizations do not have the infrastructure or computing logic in place to allow users to manually tag the video so that the manual notes and the meeting are included in a single file.

Accordingly, automated computing technology for programmatically determining, surfacing, and/or utilizing user-meeting data to determine events of interest and generating the enriched meeting playback timeline, as provided herein, can be beneficial for enabling improved computing applications and an improved user computing experience. Further, embodiments of this disclosure address a need that arises from a large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable certain events of interest to be programmatically surfaced and presented without requiring computer tools and resources for a user to manually perform operations to produce this outcome. Even if a user wanted to manually determine an event of interest, existing computer infrastructure and logic does not allow the event of interest to be generated on an enriched meeting playback timeline. In this way, some embodiments, as described herein, reduce or eliminate a need for certain databases, data storage, and computer controls for enabling manually performed steps by a person, to search, identify, assess, view a video, and configure (for example, by hard-coding) events of interest to be presented to users, thereby reducing the consumption of computing resources, such as those associated with running an entire video so that a person can manually try to identify events of interest.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that are implemented as discrete or distributed components or in conjunction with other components, and in any suitable combination and location. Various functions described herein as being performed by one or more entities may be carried out by hardware, firmware, and/or software. For instance, some functions is carried out by a processor executing instructions stored in memory.

Among other components not shown, example operating environment 100 includes a number of user computing devices, such as: user devices 102*a* and 102*b* through 102*n*; a number of data sources, such as data sources 104*a* and 104*b* through 104*n*; server 106; sensors 103*a* and 107; and network 110. It should be understood that environment 100 shown in FIG. 1 is an example of one suitable operating environment. Each of the components shown in FIG. 1 may be implemented via any type of computing device, such as computing device 900 illustrated in FIG. 9, for example. In one embodiment, these components communicate with each other via network 110, which include, without limitation, one or more local area networks (LANs) and/or wide area networks (WANs). In one example, network 110 comprises the internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment, such as the distributed computing device 1000 in FIG. 10. For instance, server 106 is provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* and 102*b* through 102*n* are the type of computing device described in relation to FIG. 9 herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104*a* and 104*b* through 104*n* may comprise data sources and/or data systems, which are configured to make data available to any of the various constituents of operating environment 100 or system 200 described in connection to FIG. 2. For instance, in one embodiment, one or more data sources 104*a* and 104*b* through 104*n* provide (or make available for accessing), to meeting-data collection component 210 of FIG. 2, user-meeting data. Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* and 104*b* through 104*n* comprise one or more sensors, which are integrated into or associated with one or more of the user device(s) 102*a*, 102*b* through 102*n* or server 106. Examples of data made available by data sources 104*a*, 104*b* through 104*n* are described further in connection to meeting-data collection component 210 of FIG. 2.

Figure 2:
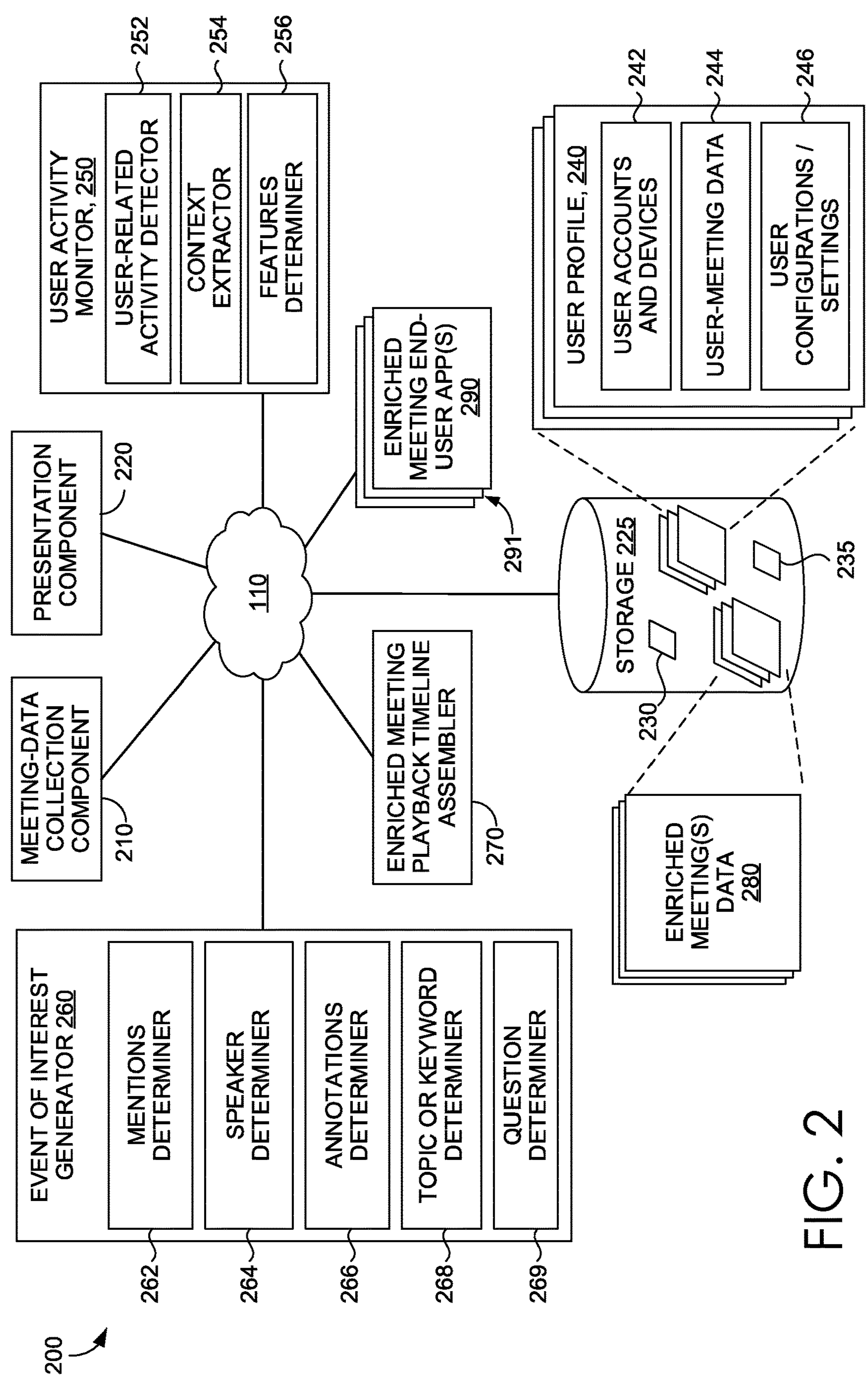
FIG. 2 is a diagram depicting an example computing architecture suitable for implementing aspects of the present disclosure.

Operating environment 100 can be utilized to implement one or more of the components of system 200, described in FIG. 2, including components for collecting user-meeting data; monitoring user activity to determine meeting data features; receiving user preferences, and/or similar categories of data regarding a meeting and a user's interactions within the meeting or the meeting recording, such as a user comments in a chat during the meeting, user annotations or comments to a window during the meeting, a verbal command uttered by the user, or related information to facilitate determining an event of interest or to otherwise provide an improved user experience; processing data to determine and generate an event of interest; and/or consuming or presenting an enriched meeting playback timeline to users. Operating environment 100 can also be utilized for implementing aspects of methods 600, 700, and 800 in FIGS. 6, 7, and 8, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that are implemented as discrete or distributed components or in conjunction with other components, and in any suitable combination and location. In one example, the computing device of FIG. 9 and the distributed computing devices of FIG. 10 performs aspects of the system 200 of FIG. 2.

Example system 200 includes network 110, which is described in connection to FIG. 1, and which communicatively couples components of system 200, including meeting-data collection component 210, presentation component 220, user activity monitor 250, event of interest generator 260, enriched meeting playback timeline assembler 270, enriched meeting end-user application 290, and storage 225. User activity monitor 250 (including its subcomponents 252, 254, and 256), event of interest generator 260 (including its subcomponents 262, 264, 266, 268, and 269), enriched meeting end-user application 290, meeting-data collection component 210, and presentation component 220, may be embodied as compiled computer instructions or functions, program modules, computer software services, or an arrangement of processes carried out on one or more computer systems, such as distributed computing device 1000, described in connection to FIG. 10, for example.

In one embodiment, the functions performed by components of system 200 are associated with one or more computer applications, services, or routines, such as an online meeting application, a video-viewing application, a communications or collaboration application, or an organizational explorer application. The functions may operate to determine or provide enriched meeting data 280 (including, without limitation, the events of interest, an enriched meeting playback timeline, and so forth). In particular, such applications, services, or routines may operate on one or more user devices (such as user device 102*a*) or servers (such as server 106). Moreover, in some embodiments, these components of system 200 are distributed across a network, including one or more servers (such as server 106) and/or client devices (such as user device 102*a*) in the cloud, such as described in connection with FIG. 10, or reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components can be shared or distributed across other components.

Continuing with FIG. 2, meeting-data collection component 210 is generally configured to access or receive (and in some cases also identify) user-meeting data, which may include data associated with a user (such as a user viewing the meeting recording or a user that attended the meeting), data associated with a meeting, or data associated with a meeting recording from one or more data sources, such as data sources 104*a* and 104*b* through 104*n* of FIG. 1. In some embodiments, meeting-data collection component 210 is employed to facilitate the accumulation of data of a particular meeting, or data of a particular user or group (or in some cases, a plurality of users including crowdsourced data) for user activity monitor 250 or its subcomponents, event of interest generator 260 or its subcomponents, the enriched meeting playback timeline assembler 270, or the enriched meeting end-user application 290. In one embodiment, the data is received (or accessed), and optionally accumulated, reformatted, and/or combined, by meeting-data collection component 210 and stored in one or more data stores such as storage 225, where it is available to other components of system 200. For example, the user-meeting data is stored in or associated with a user profile 240, as described herein, such as in user-meeting data 244 of user profile 240, or is stored in or associated with the enriched meeting data 280, as described herein. In some embodiments, any personally identifying data (for example, user data that specifically identifies particular users) is either not uploaded or otherwise provided from the one or more data sources, is not permanently stored, is de-identified, and/or is not made available to other components of system 200. In addition or alternatively, a user may opt into or out of services provided by the technologies described herein and/or select which user-meeting data and/or which sources of user-meeting data are to be captured and utilized by these technologies.

User-meeting data, in one example, comprises any information that is related to a person and that person's interactions during a meeting, as well as information related to the meeting and/or meeting recording. User-meeting data may be received from a variety of sources and available in a variety of formats. By way of example and without limitation, user-meeting data comprises at least one of: audio information (for example, an audio file having a recording of sound and spoken content from the meeting); transcript information (for example, a document having text that has been extracted out of a meeting based on audio of the meeting and/or a chat of the region); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group member, such as communications information (for example, past email, meetings, chat sessions, communication patterns or frequency, information about a user or other meeting attendees/invitees that the user had a meeting with or has an upcoming meeting with, or information about communications between a group member and one or more users), files access (for example, a file created, modified, or shared), social media or online activity, such as a post to a social-media platform or website, subscription information, information regarding topics of interest to a user, or other user-related activity that may be determined via a user device (such as user device 102*a* of FIG. 1); task-related information (for example, an outstanding task that the user has with regard to a meeting or outstanding tasks that meeting attendees have with respect to the user); information about a group or group member that they may choose to share (for example, birthday, anniversary, etc.); or information in common with the user (for example, common project teams, work groups, backgrounds, education, interests, or hobbies). Additional examples of user-meeting data are described herein.

In some embodiments, user-meeting data received via meeting-data collection component 210 is obtained from a data source (such as data source 104*a* in FIG. 1, which is a meeting hosting site, a social networking site, a professional networking site, a corporate network, an organization's intranet or file share, or other data source containing user-meeting data) or determined via one or more sensors (such as sensors 103*a* and 107 of FIG. 1), which are on or associated with one or more user devices (such as user device 102*a*), servers (such as server 106), and/or other computing devices. As used herein, a sensor may include a function, routine, component, or combination thereof for sensing, detecting, or otherwise obtaining information such as user-meeting data from a data source 104*a*, and may be embodied as hardware, software, or both. By way of example and not limitation, user-meeting data includes data that is sensed, detected, or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data, including calls, texts, chats, messages, and emails; document comments; website posts; other user-meeting data associated with communication events, including user history, session logs, application data, contacts data, calendar and schedule data, notification data, social-network data, e-commerce activity, user-account(s) data (which may include data from user preferences or settings associated with a personalization-related application, a personal assistant application or service, an online service or cloud-based account such as Microsoft 365, an entertainment or streaming media account, a purchasing club or services); global positioning system (GPS) data; other user device data (which may include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user-access, user-activity, network-access, user-device charging, or other data that is capable of being provided by one or more sensor component); data derived based on other data (for example, location data that can be derived from Wi-Fi, cellular network, or IP address data), and nearly any other source of data that is sensed, detected, or determined as described herein.

User-meeting data, particularly in the form of context data or contextual information regarding a particular user, can be received by meeting-data collection component 210 from one or more sensors and/or computing devices associated with the user. In some embodiments, meeting-data collection component 210, user activity monitor 250 or its subcomponents, enriched meeting playback timeline assembler 270, event of interest generator 260 or its subcomponents, or other components of system 200 determine interpretive data from received user-meeting data. Interpretive data corresponds to data utilized by the components or subcomponents of system 200 that comprises an interpretation from processing raw data, such as a transcript extracted from raw audio from the meeting or meeting recording, or topic information interpreted from a meeting recording, such as a chat of a meeting, a transcript, and so forth. Interpretive data can be used to provide context to user-meeting data, which can support determinations or inferences carried out by components of system 200. Moreover, it is contemplated that some embodiments of the disclosure utilize user-meeting data alone or in combination with interpretive data for carrying out the objectives of the subcomponents described herein. It is also contemplated that some user-meeting data may be processed by the sensors or other subcomponents of meeting-data collection component 210 not shown, such as for interpretability by meeting-data collection component 210. However, embodiments described herein do not limit the user-meeting data to processed data and may include raw data or a combination thereof, as described above.

In some respects, user-meeting data is provided in user-meeting data streams or signals. A "signal" can be a feed or stream of user-meeting data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. In some embodiments, meeting-data collection component 210 receives or accesses data continuously, periodically, as it becomes available, or as needed. In some embodiments, the user-meeting data, which includes data indicative of the user's interactions during a meeting or while streaming a recording of the meeting, and which is received by meeting-data collection component 210 is stored in storage 225, such as in user-meeting data 244 or enriched meeting data 280.

User activity monitor 250 is generally responsible for monitoring user activity for information that may be used for determining user-meeting data for one or more users. In some embodiments, user-meeting data associated with a particular user determined via user activity monitor 250 comprises contextual information. In some embodiments, this user-meeting data is utilized by other components of system 200 to infer an intent of the particular user and/or to further determine events of interest or enriched meeting data 280, which is used to generate the enriched meeting playback timeline that is provided to the particular user. In particular, embodiments of user activity monitor 250 determine user-meeting data associated with a particular user, which includes user-related activity data and/or context data, and/or provides the determined user-meeting data as structured data, such as one or more meeting data features, so that it may be used by other components of system 200. For instance, as further described herein, the user-meeting data is used by event of interest generator 260 to determine at least one event of interest for presentation to the user, such that the event of interest is relevant to the user's context, which is indicated by the user-meeting data. Accordingly, in some embodiments, user-meeting data determined by user activity monitor 250 or its subcomponents is used to determine contextualized events of interest for the user. The user-meeting data determined by user activity monitor 250 or its subcomponents may also be stored in a user profile 240 associated with a user, such as in user-meeting data 244 of user profile 240, where it may be accessible to other components of system 200. Similarly, in some implementations, the events of interest determined by event of interest generator 260, or its subcomponents, are stored in a user profile 240, such as in user-meeting data 244 of user profile 240, where it is accessible to other components of system 200.

In some embodiments, user activity monitor 250 determines current or near-real-time user activity information and also determines historical user activity information, which is determined based on gathering observations of user activity over time, accessing user logs of past activity (such as communication history, a user activity during a meeting, and the like, for example). Accordingly, user activity monitor 250 can determine current and historic user activity information that may be used by user activity monitor 250 or other components of system 200 to determine, for example, that: a meeting is taking place; a meeting has occurred; a user is listed as an invitee for a meeting; a user is listed as an attendee for the meeting; a role of a user within an organization (for example, professor or student); a description of a meeting; a time and date during which the meeting is taking or took place; conferences or meetings in which the user spoke; and an indication that the particular user and the other users have attended meetings together, have similar interests or similar characteristics, have worked in the same office or location, or that the particular user and the other user share a connection with a third user.

In some embodiments, the user-meeting data determined by user activity monitor 250 (or its subcomponents) includes user-related activity information from one or multiple user devices associated with a user and/or from cloud-based services associated with a user (such as email, meeting information sources, calendars, social media, or similar information sources), and/or includes contextual information associated with the user activity or user-meeting data. For example, information about user activity on a particular device or cloud-based service is used to determine a context associated with the user, which is used for determining an event of interest and the corresponding timing associated with the event of interest for displaying to the user or providing to a computing application or service. In an embodiment, user activity monitor 250 includes one or more computing applications or services that analyze information detected via one or more user devices used by a user and/or cloud-based services associated with the user to determine activity information and/or contextual information. Information about user devices associated with a user may be determined from the user-meeting data made available via meeting-data collection component 210, and may be provided to user activity monitor 250 or other components of system 200. More specifically, in some implementations of user activity monitor 250, a user device is identified by detecting and analyzing characteristics of the user device, such as device hardware, software (such as operating system (OS)), network-related characteristics, user accounts accessed via the device, and similar characteristics. For example, information about a user device is determined by using functionality of many operating systems to provide information about the hardware, OS version, network connection information, installed application, or the like. The number of events of interest that a user device may present on the enriched meeting playback timeline may be based on the type of user device. For example, a mobile device presents less events of interest on the enriched meeting playback timeline than a laptop device, at least because there is more screen size on the laptop device.

Some embodiments of user activity monitor 250 or its subcomponents determine a device name or identification (device ID) for each device associated with a user. This information about the identified user device(s) associated with a user may be stored in a user profile associated with the user, such as in user accounts and devices 242 of user profile 240. In an embodiment, a user device is polled, interrogated, or otherwise analyzed to determine information about the device. This information may be used for determining a label or identification of the device (for example, a device ID) so that user interaction with the device may be recognized from user-meeting data by user activity monitor 250. In some embodiments, users declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account (MSA), email account, social network, or the like, are identified and determined to be associated with the user.

As shown in example system 200, user activity monitor 250 comprises a user-related activity detector 252, context extractor 254, and features determiner 256. In some embodiments, user activity monitor 250, one or more of its subcomponents, or other components of system 200 determines interpretive data based on received user-meeting data, such as described previously. It is contemplated that embodiments of user activity monitor 250, its subcomponents, and other components of system 200 may use the user-meeting data and/or interpretive data for carrying out the objectives of the subcomponents described herein. Additionally, although several examples of how user activity monitor 250 and its subcomponents identify user-related activity information are described herein, many variations of user activity identification and user activity monitoring are possible in various embodiments of the disclosure.

User-related activity detector 252, in general, is responsible for determining (or identifying) that a user action or user-activity event has occurred. Embodiments of user-related activity detector 252 are used for determining current user activity or historical user actions. Some embodiments of user-related activity detector 252 monitor user-meeting data for activity-related features or variables corresponding to various user activity such as indications of user inputs into a chat, locations or visits, information about meetings attended, identities of speakers in the meeting, applications launched or accessed, files accessed or shared, websites navigated to, media played, or similar user activities. Additionally, some embodiments of user-related activity detector 252 extract, from the user-meeting data, information about user-related activity, which includes current user activity, historical user activity, and/or related information such as context.

Alternatively, or in addition, in some embodiments context extractor 254 determines and extracts context. Similarly, in some embodiments features determiner 256 extracts information about a user and a meeting, such as meeting data features, based on an identification of the activity determined by user-related activity detector 252. Examples of extracted user-related activity information include user location, app usage, online activity, searches, communications such as chat, call, or message information, types of meetings attended (including the duration of meeting, topics of the meeting, and speakers of the meeting), usage duration, application data (for example, emails, meeting invites, messages, posts, user status, notifications, etc.), or nearly any other data related to user interactions with the user device or user activity via a user device. For example, a user's location is determined using GPS, indoor positioning (IPS), or similar communication functionalities of a user device associated with a user.

Data determined from user-related activity detector 252 may be provided to other subcomponents of user activity monitor 250 or other components of system 200, or may be stored in a user profile associated with the user, such as in user-meeting data 244 of user profile 240. In some embodiments, user-related activity detector 252 or user activity monitor 250 (or its other subcomponents) performs conflation on detected user-meeting data. For example, overlapping information is merged and duplicated, or redundant information is eliminated.

In some embodiments, the meeting data features are interpreted to determine that particular user activity has occurred. For example, in some embodiments, user-related activity detector 252 employs user-activity event logic, which includes rules, conditions, associations, classification models, or other criteria to identify user activity. In one embodiment, user activity event logic includes comparing user activity criteria with the user-meeting data in order to determine that an activity event has occurred. Similarly, activity event logic may specify types of detected user-device interaction(s) that are associated with an activity event, such as navigating to a portion of a meeting recording, uttering a command, inputting a user input into a meeting chat, downloading meeting recordings, or launching an app. In some embodiments, a series or sequence of user device interactions is mapped to an activity event, such that the activity event is detected upon determining that the user-meeting data indicates that the series or sequence of user interactions has been carried out by the user.

In some embodiments, user-related activity detector 252 runs on or in association with each user device for a user. User-related activity detector 252 may include functionality that polls or analyzes aspects of the operating system to determine user activity related features (for example, installed or running applications or file accesses and modifications), network communications, and/or other user actions detectable via the user device including sequences of actions.

Context extractor 254 is generally responsible for determining a context associated with user-related activity or user-meeting data. As further described herein, a context (or context logic) may be used to determine an event of interest, to assemble or format an indication of event of interest on an enriched meeting playback timeline for presentation to a user, or for consumption by a computing application. By way of example, a context comprises information about a user's current activity, such as application usage, meeting-recording consumption time, communication or interaction during a meeting or while watching a meeting recording; and/or a user's interaction with a chat, a text window, or other suitable interactions. For instance, a context can indicate types of user activity, such as a user attending or scheduling a meeting, sending a message (to the entire audience chat or directly to one or more other users), or viewing a meeting recording. Alternatively, or in addition, a user may explicitly provide a context, such as performing a query for a particular topic or meeting, which may be performed via a meeting hosting application, an organizational explorer application, and the like. In one embodiment, a context includes information about a meeting or meeting recording with which the user is interacting or accessing information about, as in where a user hovers their mouse over an indication of a meeting, meeting recording, or other suitable GUI elements.

Some embodiments of context extractor 254 determine context related to a user action or activity event, such as people entities identified in a user activity or related to the activity (for example, recipients of a message or chat sent by the user, which is sent to an alias corresponding to the audience or meeting attendees), which includes nicknames used by the user (for example, "professor" and "classmate," referring to specific entities identified in the user's contacts by their actual names, or group names such as "project team" or "book club," which refer to specific groups of people identifiable from user-meeting data), and utilize a named-entity extraction model or named-entity recognition model. Context extractor 254 may also determine event of interest related information or, which may include information about a user's focus on previous meeting recording. By way of example and not limitation, this includes context features such as: meeting-attendee data; meeting-invitee data; contextual information about a type of meeting; other information about the meeting recording such as a description of the meeting, topics covered by the meeting, and so forth; information detected by sensor(s) on user devices associated with the user that is concurrent or substantially concurrent to the detected user activity; or any other data related to the user activity that is detectable and used for determining a context of the user-related activity.

In some embodiments, context extractor 254 comprises one or more applications or services that parse or analyze information detected via one or more user devices used by the user and/or cloud-based services associated with the user to identify, extract, or otherwise determine a user-related or user-device-related context. Alternatively, or in addition, some embodiments of context extractor 254 may monitor user-meeting data, such as that received by meeting-data collection component 210 or determined by user-related activity detector 252, for information that may be used for determining a user context. In some embodiments, this information comprises features (sometimes referred to herein as "variables") or other information regarding specific user-related activity and related contextual information. Some embodiments of context extractor 254 determine, from the monitored user-meeting data, a user context associated with a particular user, user device, or a plurality of users (such as a specific group of people, a group of people sharing a role within an organization, a student, a professor, or faculty) and/or user devices. In some embodiments, a user context determined by context extractor 254 is provided to other components of system 200 or stored in a user profile 240 associated with a user, such as in user-meeting data 244 of user profile 240, where it is accessed by other components of system 200.

Features determiner 256 is generally responsible for determining or extracting one or more meeting data features (or variables) characterizing the user or meeting, and/or for determining structured user data associated with a user or meeting. Meeting data features may be determined from information about user-meeting data received from meeting-data collection component 210 or from user-related activity data, which may include context data determined by user activity monitor 250. In some embodiments, features determiner 256 receives information from one or more of these other components of system 200 and processes the received information to determine one or more meeting data features that are specific to a user. For example, user-meeting data processed by features determiner 256 comprises unstructured, semi-structured, or structured data about a user (or other users). In some embodiments, this received user-meeting data is converted into a structured data schema or record, a feature vector, one or more data feature-value pairs, or other data record that is usable for determining an event of interest. The meeting data features or structured user-meeting data determined by features determiner 256 may be provided to other components of system 200 or stored in a user profile associated with a user, such as in user-meeting data 244 of user profile 240, where it may be accessed by other components of system 200.

Examples of meeting data features determined or extracted by features determiner 256 include, without limitation: data from information sources associated with the user, such as an organizational chart or employment data (for example, who a user reports to, works with, manages (or who reports to a user)); a user's role; information about project team(s), which can include project-team members, or similar information; social media or social collaboration information sources (for example, the user's LinkedIn® connections or GitHub® contributions or collaborations); location-related features; venue-related information associated with the location or other location-related information; other users present at a venue or location; time-related features; current-user-related features, which include information about the current or recent user of the user-device; user device-related features, such as device type (for example, desktop, tablet, mobile phone, fitness tracker, heart rate monitor, or other types of devices), hardware properties or profiles, OS or firmware properties, device IDs or model numbers, network-related information, position/motion/orientation-related information about the user device, network usage information, app usage on the device, user account(s) accessed or otherwise used (such as device account(s), OS level account(s), or online/cloud-service related account(s) activity, such as Microsoft® MSA account, online storage account(s), email, calendar, meetings, or social networking accounts); content-related features, such as meeting topics, presentations, a text transcript of the meeting (that is correlated to a timing or duration of the meeting, a speaker of the meeting, or topic), or attendees; user activity, such as verbal commands, annotations to the meeting recording, searches, browsed websites, purchases, social networking activity, communications sent or received including social media posts; or any other features that are detected or sensed and used for determining data associated with or characterizing a user or meeting.

Some embodiments of features determiner 256, or more generally user activity monitor 250, can determine interpretive or semantic data from the user-meeting data, which is used to determine meeting data features or other structured user data. For example, while a user-activity feature indicates a location visited by the user, a semantic analysis determines information about the location, such as that the location is a gym, a coffee house, or a company office, or to determine other data associated with detected user activity or user data. Thus, semantic analysis may determine additional user-activity related features or user data that is semantically related to other data and which may be used for further characterizing the user or for determining a context.

In one embodiment, a semantic analysis is performed on at least a portion of user-meeting data to characterize aspects of the user-meeting data. For example, in some embodiments, user-related activity features is classified or categorized (such as by type, time frame or location, work-related, home-related, themes, related entities, other user(s) (such as communication to or from another user) and/or relation of the other user to the user (for example, family member, close friend, work acquaintance, boss, or the like, or other categories), or related features are identified for use in determining a similarity or relational proximity to other user-related activity events. In some embodiments, a semantic analysis utilizes a semantic knowledge representation, such as a relational knowledge graph. A semantic analysis may also utilize semantic analysis logic, including rules, conditions, or associations to determine semantic information related to a user activity. For example, a user-related activity event comprising a message sent to another meeting attendee during the meeting is characterized as a work-related activity, which is used to infer a relationship that the user works with the message recipient. A semantic analysis may also be used to further determine or characterize a context, such as determining that a topic of a meeting that has been watched by the user is associated with user-related activity corresponds to a topic of interest based on time spent or frequency the user has accessed the meeting recording or portion of the meeting recording. For example, the user's topic of interest is determined (using semantic analysis logic) to be the topic of the meeting recordings the user has spent the most time watching. Similarly, the semantic analysis may determine other suitable events of interest.

Continuing with FIG. 2, event of interest generator 260 is generally responsible for determining an event of interest and an event time (for example, a time that the event of interest occurred during the meeting or meeting recording) based on user-meeting data, and the event of interest may be specific to the user. Embodiments of event of interest generator 260 determine and generate an event of interest and associated event time based on the user activity monitor 250. Thus, information about an event of interest to be generated may be received from the user activity monitor 250 or the user-meeting data 244 in storage 225. In one embodiment, an event of interest and associated data as generated and determined by the event of interest generator 260 (or its subcomponents) is stored as enriched meeting data 280, where it is used by other components or subcomponents of system 200, such as the enriched meeting playback timeline assembler 270. Alternatively, or in addition, an event of interest determined by event of interest generator 260 may be provided to a user, such as a user who is viewing the meeting recording or who attended the meeting. In some embodiments, the event of interest determined by event of interest generator 260 (or its subcomponents) comprises one or more events of interest, each identifying and characterizing an event of interest and each being associated with an event time, based on the user activity monitor 250.

Embodiments of event of interest generator 260 may determine the event of interest based on: data associated with the meeting or meeting recording; data associated with a particular user, such as a user interacting (for example, inputting text such as a chat message, uttering a voice command, making a selection, or another user interaction) via a GUI during the meeting or after the meeting while viewing the meeting recording; or a combination thereof. In one embodiment, event of interest generator 260 is provided with data about a particular user and/or data about the meeting or meeting recording, both of which are received from or determined from the user data determined by user activity monitor 250, meeting-data collection component 210, or from one or more user profiles 240, for example. As user-meeting data associated with a particular user and/or meeting may be utilized to determine that user's context or indicate that user's intent, as described previously, an event of interest that is determined by event of interest generator 260 using this user-meeting data may be determined based on the user's context or intent.

Some embodiments of event of interest generator 260 utilize event of interest determination logic 230 to determine an event of interest for presentation to a user. In one embodiment, event of interest determination logic 230 comprises computer instructions including rules, conditions, associations, predictive models, classification models, or other criteria for, among other operations, determining an event of interest, determining relevance of an information item to a particular user, scoring or ranking events of interest for relevance, indexing the events of interest, or contextualizing an event of interest for a user. Event of interest determination logic 230 may take different forms, depending on the particular information items being determined, contextualized, or processed for relevance, and/or based on user-meeting data or data indicating a context. For example, event of interest determination logic 230 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these to determine (or facilitate determining) an event of interest according to embodiments described herein.

Figure 3:
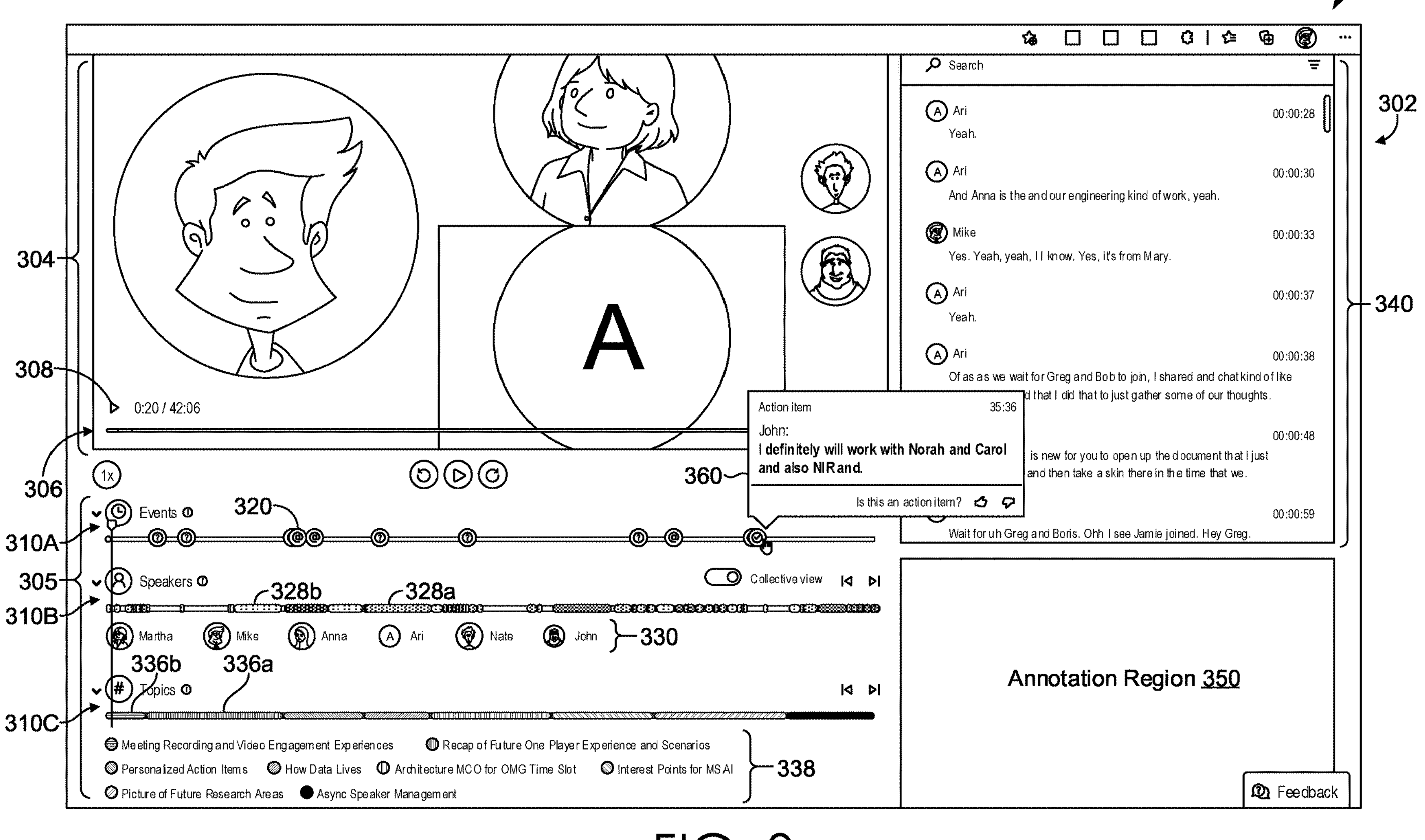
FIG. 3 illustratively depicts an example schematic screenshot from a personal computing device showing aspects of an example graphical user interface, in accordance with an embodiment of the present disclosure.

In some embodiments, the event of interest generator 260 indexes the events of interest to facilitate the enriched meeting playback timeline assembler 270 in generating the enriched meeting playback timeline. In one embodiment, the event of interest is indexed and used to generate an enriched meeting playback timeline. For example, as illustrated in FIG. 3, three separate enriched meeting playback timelines 310 are generated, such that each enriched meeting playback timeline is indexed based on a corresponding event of interest. Continuing this example from FIG. 3, the first enriched meeting playback timeline 310A has been indexed based on events of interest other than those of the second and third enriched meeting playback timeline, the second enriched meeting playback timeline 310B has been indexed based on identified speakers, and the third enriched meeting playback timeline 310C has been indexed based on topics.

In some embodiments, the event of interest determined by event of interest generator 260 (which are determined using event of interest determination logic 230) is based on explicit or inferred information about the meeting, the meeting recording, and/or the user. For example, event of interest determination logic 230 includes logic specifying instructions for detecting explicit information about the meeting or meeting recording, determining an event time of the explicit information, or similarly for inferring an event of interest based on particular user-meeting data, such as particular data features or patterns of meeting data features. Without limitation, examples of explicit information about an event of interest can comprise a document or selection criteria completed by the user regarding events of interest that the user has explicitly declared. Examples of inferred data associated with an event of interest comprise user activity related prior meetings, such as common topics, durations, and the like, or, similarly the frequency, rate, or count of meeting recording accessed by the user. For example, event of interest determination logic 230 includes logic for determining information about meeting recordings (other than the current meeting recording or meeting) accesses by the user, such that event of interest generator 260 uses the file access information to infer that, based on the previously attended meetings or previously accessed meeting recordings being frequently accessed by the user, a particular event of interest that should be included as an event of interest for presentation to the user, which can improve user productivity and reduce computational resources associated with a user having to re-watch a meeting recording numerous times.

Some embodiments of event of interest determination logic 230 comprise a plurality of logic for determining various types or categories of events of interest, and/or include corresponding logic for determining the relevance of each type/category to a user. Alternatively, in embodiments without event of interest determination logic 230, event of interest generator 260 determines one or more categories of the event of interest for presentation, for example, on the enriched meeting playback timeline to the user. By way of example and without limitation, categories of event of interest determined by event of interest generator 260 (which may use event of interest determination logic 230, in some embodiments) can comprise: information of a question being asked, as identified by determining the use of "who," "what," "where," "when," or any other question-promoting words or phrases; information indicative of a person being mentioned, such as a person being ranked higher than another person (such as a company chief operating officer (CEO) being ranked higher than a company vice president (VP)); information that a particular speaker is speaking; information of a topic of interest to the user; an indication of key words relevant to the user being identified, such as the words "exam," "final," "test," "graded," or "presentation" being identified as key words relevant to a student user; information regarding interactions between the user and previous meetings, such as past communication activity in meetings attended by the user; and/or so forth. Additionally, the specific events of interest in these categories (or another category) may be programmatically generated or determined for relevance to the user according to the event of interest determination logic 230. For example, in one embodiment, an event of interest is determine automatically by detecting a mention of a particular user, the start of the session of a particular speaker, a keyword mention, a question being asked, or a marking or word indicative of a type of event of interest. One example illustratively depicting one or more events of interest presented on an enriched meeting playback timeline as determined by event of interest generator 260 (which uses event of interest determination logic 230) is provided in FIG. 3 as events of interest 320 included in the enriched meeting playback timeline 310.

In some implementations, the event of interest generator 260 includes one or more subcomponents operable to generate an event of interest according to a category. In one embodiment, a dedicated subcomponent is used for determining a particular category of user-meeting data. For example, the event of interest generator 260 generates an action item interpolated from an event of interest. The action item may correspond to a task which the user may complete. The action items may be communicated to a productivity application, such as a calendar, email service, and so forth. The action item may be stored as enriched meeting data 280.

Further, in some embodiments, the dedicated subcomponent utilizes event of interest determination logic 230 that is specific for determining the particular category of the event of interest. For instance, as shown in example system 200, event of interest generator 260 comprises mentions determiner 262, speaker determiner 264, annotations determiner 266, topic/keyword determiner 268, and question determiner 269. Mentions determiner 262, in general, is responsible for determining user-meeting data that comprises a person or entity being mentioned during the meeting. The user-meeting data may be determined as an event of interest indicating that a particular person or entity was mentioned during the meeting. For example, the mention of the person or entity can include, without limitation, instances during the meeting when a speaker uttered the name or identity of the person or entity, such as when the speaker uttered the name of the user or any person determined to be of interest to the user based on the user profile 240. Mentions may include a mention of a person or entity by someone other than the speaker via any suitable type of communication, such as, chats, post-meeting question-and-answer sessions, or chat sessions. Embodiments of mentions determiner 262 use user-meeting data associated with a user and with the meeting to determine an event of interest. The user-meeting data is received, for example, from user activity monitor 250, meeting-data collection component 210, or from storage 225, such as from a user profile 240 or enriched meeting data 280. Examples of events of interest determined by mentions determiner 262 and indicating an event of interest are illustratively depicted in item 320 of FIG. 3.

In some embodiments, an event of interest including a mention of a person or entity is determined by mentions determiner 262 and ranked for relevance to the user so that mentions that are more relevant are given priority and/or provided over mentions that are less relevant. For example, as described previously, event of interest determination logic 230 is used to determine relevance of an event of interest to a particular user, determine an event time of the event of interest, as well as score or rank events of interest for relevance. In particular, relevance to a user may be determined based on any number of criteria such as, without limitation, freshness (or how recently the mentioned occurred); the number of times any name or entity was mentioned during the meeting (for example, as determined by processing a transcript of the meeting); or the importance of the person or entity that was mentioned relative to the user.

Speaker determiner 264, in general, is responsible for determining an identity of the speakers presenting content during the meeting. For example, a speaker might include a person who spoke for more than a threshold amount of time, such that those speakers who do not speak for a duration exceeding the threshold amount of time are classified as not speakers (and instead classified as people interrupting a meeting by asking questions or clarifying a point made by the speaker). Embodiments of speaker determiner 264 can process user-meeting data associated with a user and with the meeting or meeting recording to determine a speaker. In some embodiments, user-meeting data (such as communications data from a meeting or meeting recording associated with a user (for instance, patterns of communication by the various speakers), location of the meeting, relationship data indicative of a relationship between the speaker and the user, which is determined from an organizational chart or contacts list, or other user-meeting data) is processed to determine a speaker. For example, meeting data features is compared to determine a speaker, such as by performing a comparison of meeting data features that comprise information regarding the speaking tempo and identity of speakers listed in an agenda providing information of the meeting. Specifically, a comparison operation can be performed to determine those different speaking patters, which can indicate an instance of different speakers in a meeting. The user-meeting data, that is utilized by speaker determiner 264, may be received, for example, from user activity monitor 250 (or a subcomponent, such as features determiner 256), meeting-data collection component 210, or from storage 225, such as from a user profile 240 or enriched meeting data 280.

As described previously, embodiments of speaker determiner 264 utilize event of interest determination logic 230 to determine an event of interest to be included in the enriched meeting playback timeline. The event of interest may comprise an indication of a speaker, such as illustratively depicted in item 310B of FIG. 3. According to one embodiment, speaker determiner 264 processes user-meeting data to determine a speaker of a meeting according to the following method. First, one or more speakers/people that were listed in a meeting description or that were identified during the meeting may be identified. In some embodiments, the speakers are ranked based on the duration of time a corresponding speaker spent speaking or the frequency with which the speaker spoke, or based on a relationship of the speaker to a user. Further, some embodiments consider communications or interactions having at least a threshold time duration, such as portions of the meeting exceeding two minutes having a common speaker. Next, user-meeting data for the user is processed to determine a relationship between the user and the speaker. Where at least one communication of a threshold duration is determined, then that person delivering the communication is determined to be a speaker. In some embodiments, the number of speakers that are determined and to be included in the enriched meeting playback timeline are reduced or filtered, for example, based on a screen size of the user device or based on a number of other events of interest determined. In these embodiments, the speakers are ranked by event of interest determination logic 230 to determine the top speakers to the user based on user-meeting data. In this way, the speakers ranked highest can take priority when included or shown on the enriched meeting playback timeline to improve the order of information presented to the user. In one embodiment, an enriched meeting playback timeline having segments corresponding to each speaker are generated by the enriched meeting playback timeline assembler 270, as illustrated with respect to item 310B of FIG. 3.

Annotations determiner 266, in general, is responsible for determining annotations or user inputs in which a user provides an input indicative of an event of interest. For example, and without limitations, annotations comprise at least one of: a user selection while watching the meeting recording indicating that a particular event of interest has occurred; a user input, such as a string of alphanumeric characters (such as: "#?" to indicate that the user wants to tag a question that recently occurred as an event of interest, "#@" to indicate that the user wants to tag a mention that recently occurred as an event of interest, and #exam to indicate that the user wants to tag a phrase containing the word "exam" and related synonyms as an event of interest); user interactions with members in the chat during the meeting; and so forth. Embodiments of annotations determiner 266 determine one or more annotations related to a meeting recording provided to a user as an event of interest on an enriched meeting playback timeline. Thus, in some embodiments, an event of interest provided to a user comprises an indication an event of interest generated based on a user annotation, such as a user interaction with the annotation region 350 illustratively depicted in FIG. 3.

Some embodiments of annotations determiner 266 can determine a user input from the user and associate the command with a library of commands, which the user is able to customize In one embodiment, the annotations determiner 266 detects an initial marking or wake-word, such as a word, phrase, symbol, or other alpha-numeric character(s) (for example, either written or uttered), that indicates an intent to designate an event of interest. In some embodiments, based on the detection of this initial marking or wake-word, the annotation determiner 266 enters a monitoring mode of operation to detect a subsequent user input, such as a subsequent marking that can be word, phrase, symbol, or other alpha-numeric character(s) that indicates a type of event of interest. For example, the user input may be received from user activity monitor 250. Thereafter, in one embodiment, the annotations determiner 266 detects the subsequent marking indicative of a type of event of interest.

By way of non-limiting example, suppose the initial marking includes a "#" symbol that serves as an initial marking or wake-word. Continuing the example above, the user inputting a symbol "#" serves as the initial marking or wake-word indicating that the user is inputting an annotation that should be included as an event of interest. In this example, the annotations determiner 266 associates a timing when the user input the symbol "#" with a time during the meeting or meeting recording. In one embodiment, the timing when the user input the initial marking or wake-word corresponds to an event time associated with the event of interest. By associating the time during the meeting or meeting recording during which the user input the "#" symbol, the annotations determiner 266 may analyze the time in the meeting preceding or following the user input to determine an event of interest. For example, a user watching a meeting recording inputs "#?" at 20 minutes into the meeting recording, where "?" is the subsequent marking or word indicating that the type of event of interest is a question. Based on the "#?" symbol, the annotations determiner 266 automatically analyze the meeting recording (for example, transcript) to identify a question being asked as discussed above. In some embodiments, the initial marking (or wake-word) or the subsequent marking or word is predefined and can be specified by the user or administrator, and stored in user profile 240.

In one embodiment, because a user actively input the annotation, an event of interest generated by the annotations determiner 266 is ranked higher than an event of interest automatically generated by another component of the event of interest generator 260 (such as subcomponents 262, 264, 268, and 269). In this manner, events of interest that are generated in response to a manual input (for example, via the annotations determiner 266) may override an event of interest determined by subcomponents mentions determiner 262, speaker determiner 264, topic/keyword determiner 268, and question determiner 269.

Embodiments of annotations determiner 266 process user-meeting data associated with a particular user, meeting, or meeting recording to determine relevance of the event of interest to the user. In some embodiments, the user-meeting data is processed by annotations determiner 266 to determine user interactions within annotation region 350 of the GUI 302 of FIG. 3. The interactions, such as the user inputs to a chat or text region described herein, may be used for determining that a particular event of interest associated with the annotation is relevant to the user. The user-meeting data may be received, for example, from user activity monitor 250 (or a subcomponent, such as features determiner 256), meeting-data collection component 210, or from storage 225, such as from a user profile 240 or enriched meeting data 280.

Topic/keyword determiner 268, in general, is responsible for determining specialization information of the meeting, such as topics covered during a corresponding segment of the meeting or keywords provided during the meeting or meeting recording. One example of events of interest comprising keywords and topics is illustratively provided in items 310C, respectively, of FIGS. 3 and 4. Embodiments of topic/keyword determiner 268 determine explicit usage of keywords or inferred topics covered by a speaker, and generate an event of interest comprising an indication of the keyword or topics. For instance, a user (or an administrator) creates a list of topics or specify content keywords that are relevant to the user. Alternatively or in addition, the keywords or topics may be automatically generated by the topic/keyword determiner 268, for example, based on user-meeting data. Similarly, annotations determined by annotations determiner 266 may be used by topic/keyword determiner 268 to select topics that would be relevant to the user. Some embodiments use user-meeting data to determine content from which topic/keyword determiner 268 can infer topics and/or keywords that that would serve as events of interest. Once the content is determined, according to an embodiment, topic/keyword determiner 268 performs a topic analysis operation (or topic detection, topic modeling, or topic extraction) to determine one or more topics from the content. In some embodiments, the topic(s) determined from the topic analysis are determined as an event of interest. In other embodiments, the frequency or recency of topic(s) determined by the topic analysis is determined such that those topics occurring frequently or recently are determined as events of interest.

In some embodiments, a computer application or service for identifying topics associated with particular people is used to determine topics associated with speakers. From those topics associated with speakers, events of interest, such as a topic or keyword, may be determined. For instance, the topics determined to be associated with the speaker comprises the events of interest. Alternatively, from the topics determined to be associated with speakers, those topics occurring most often may be determined as events of interest. One such example of a computer application or service for identifying topics associated with particular people is Microsoft Viva™ Topics.

Some embodiments of topic/keyword determiner 268 can determine topics or keywords that are relevant to a user based on event of interest determination logic 230 and/or based on user-meeting data associated with the user, meeting, or meeting recording, as described herein. For example, topics or keywords that are relevant to a user comprise topics or keywords that are similar to the user's topics or keywords that are similar to topics or keywords occurring in recent user activity performed by the user.

Question determiner 269, in general, is responsible for determining questions being asked during the meeting, either by the speaker or an attendee or other person from the audience. Examples of questions determined by question determiner 269 comprise, without limitation at least one of: a portion of a speaker's presentation in which the speaker's speaking tempo changed; certain words being identified, such as words like "question", "who," "what", "where", "when" and the like, as well as the phrases following these words; and the like. Embodiments of question determiner 269 determine an inquiry from a chat or other communication other than the speaker. For example, in one embodiment, the question determiner 269 analyzes a chat or corresponding transcript to determine times in the meeting during which an audience or speaker asked a question.

In some embodiments, the question determiner 269 associates the question asked with when the question was answered. For example, when a meeting attendee asked a question in a chat at minute 25, and the speaker answered the question at minute 35 (for example, after reading the chat), the question determiner 269 associates the question (from minute 25) to the later associated answer (from minute 35). The question determiner 269 may associate a question and an answer based on a comparison of the topic associated with the question and a topic associated with candidate answers. In one embodiment, the question determiner 269 employs any suitable rules (which include static or predefined rules defined by the event of interest determination logic 230), Boolean logic, decision trees (for example, random forest, gradient boosted trees, or similar decision algorithms), conditions or other logic, a deterministic or probabilistic classifier, fuzzy logic, neural network, finite state machine, support vector machine, logistic regression, clustering, machine learning techniques, similar statistical processes, or combinations of these.

As described herein, some embodiments of event of interest generator 260 employs event of interest determination logic 230 to determine relevance of user-meeting data with respect to a particular user, and/or to determine a relevance weight for a particular event of interest. Relevance weights of events of interest may be used to determine which events of interest to provide to a user (For example, as further described herein, some embodiments of enriched meeting playback timeline assembler 270 determine specific events of interest to be provided based on their corresponding relevance weight.) For instance, according to some embodiments, one or more events of interest are determined by event of interest generator 260 (or its subcomponents) to be potentially provided to a user. Then, in one embodiment, for each event of interest, a relevance weight is determined and used for inferring relevance of an event of interest to the user such that a high weighting (or, conversely, a low weighting) indicates higher (or lower) relevance. Embodiments of event of interest generator 260 or event of interest determination logic 230 use user-meeting data associated with a particular user to determine the relevance of the event of interest to the user, which is represented as the relevance weight associated with the event of interest.

A relevance weight of the event of interest is determined, for example and without limitation: based on the particular type or category of event of interest; based on user history, such as whether the user has previously been presented (or engaged) with a particular event of interest; and/or based on settings or preferences, which can be configured by the user or an administrator, such as user configurations/settings 246 in a user profile 240. As a non-limiting example, where the event of interest indicates an annotation, a relevance weight is scaled up to be higher since the corresponding event of interest was manually created. In one embodiment, an event of interest that is determined/generated by the annotations determiner 266 is associated with a higher weight than an event of interest determined/generated by the mentions determiner 262, the speaker determiner 264, the topic/keyword determiner 268, and/or the question determiner 269. However, it should be understood that any other type of event of interest may be associated with a higher weight, for example, based on the user profile 240.

Continuing with example system 200 of FIG. 2, enriched meeting playback timeline assembler 270 is generally responsible for assembling, formatting, or preparing group data for presentation to a user. In particular, embodiments of enriched meeting playback timeline assembler 270 determine at least one event of interest to provide to a user, screen parameters for presenting the events of interest, and/or the presentation or formatting of the enriched meeting playback timeline to the user. Data associated with the event of interest may be received from event of interest generator 260 (or its subcomponents) or from enriched meeting data 280. In some embodiments, user-meeting data associated with a particular user, which indicates that user's context and/or intent when interacting with a meeting or meeting recording, is used by enriched meeting playback timeline assembler 270 to determine and assemble of the at least one event of interest for the user. Thus, enriched meeting playback timeline assembler 270 also may receive user-meeting data for a user and/or meeting from user activity monitor 250 (or its subcomponents), meeting-data collection component 210, or a user profile 240. Further, in some embodiments of enriched meeting playback timeline assembler 270, the at least one event of interest, the amount of events of interest provided on the enriched meeting playback timeline, and/or the presentation or formatting of the events of interest provided to the user is determined based on the user-meeting data associated with the user, such as described herein.

In some embodiments, events of interest determined by event of interest generator 260 have a corresponding relevance weight. Accordingly, embodiments of enriched meeting playback timeline assembler 270 can be configured to use the corresponding relevance weight of the events of interest to rank, prioritize, or filter specific events of interest and/or organize arrangement of the events of interest on the enriched meeting playback timeline. Events of interest that have a relevance weight indicating greater relevance to the user (for example, a higher weight) are more likely to be provided to the user, for example, when display space or space on the enriched meeting playback timeline is limited. Further, as described in connection with event of interest generator 260, relevance can be determined based on user-meeting data, which indicates a user context or intent. Therefore, in some embodiments, events of interest provided to a user are provided based on the user context or intent. In this way, events of interests generated and provided to a user may be considered to be contextualized for the user.

Some embodiments of enriched meeting playback timeline assembler 270 are configured to filter events of interest or user-meeting data so that a portion of the enriched meeting data 280 is provided to a particular user, such as a portion that has greater relevance, as indicated by a determination of relevance (for example, a relevance weight) of events of interest, or a portion that includes diverse types of events of interest, or both: a combination of diverse types of events of interest and relevant events of interest. For example, according to one embodiment, for one or more candidate events of interest determined by event of interest generator 260, enriched meeting playback timeline assembler 270 determines the type of event of interest (which is determined, for instance, based on the particular subcomponent of event of interest generator 260 that generated the information item). Then, enriched meeting playback timeline assembler 270 can determine a number of the most relevant information items (for example Those having the highest relevance weight) for providing to the user, such as the top two, three, four, five, ten, and so forth, of the most relevant information items. In some instances, if fewer events of interest exist for a particular type (for example, if there are no events of interest indicating a mention of a speaker), then more events of interest for another type (for example, events of interest associated with an annotation) are determined to be provided to the user.

Figure 4:
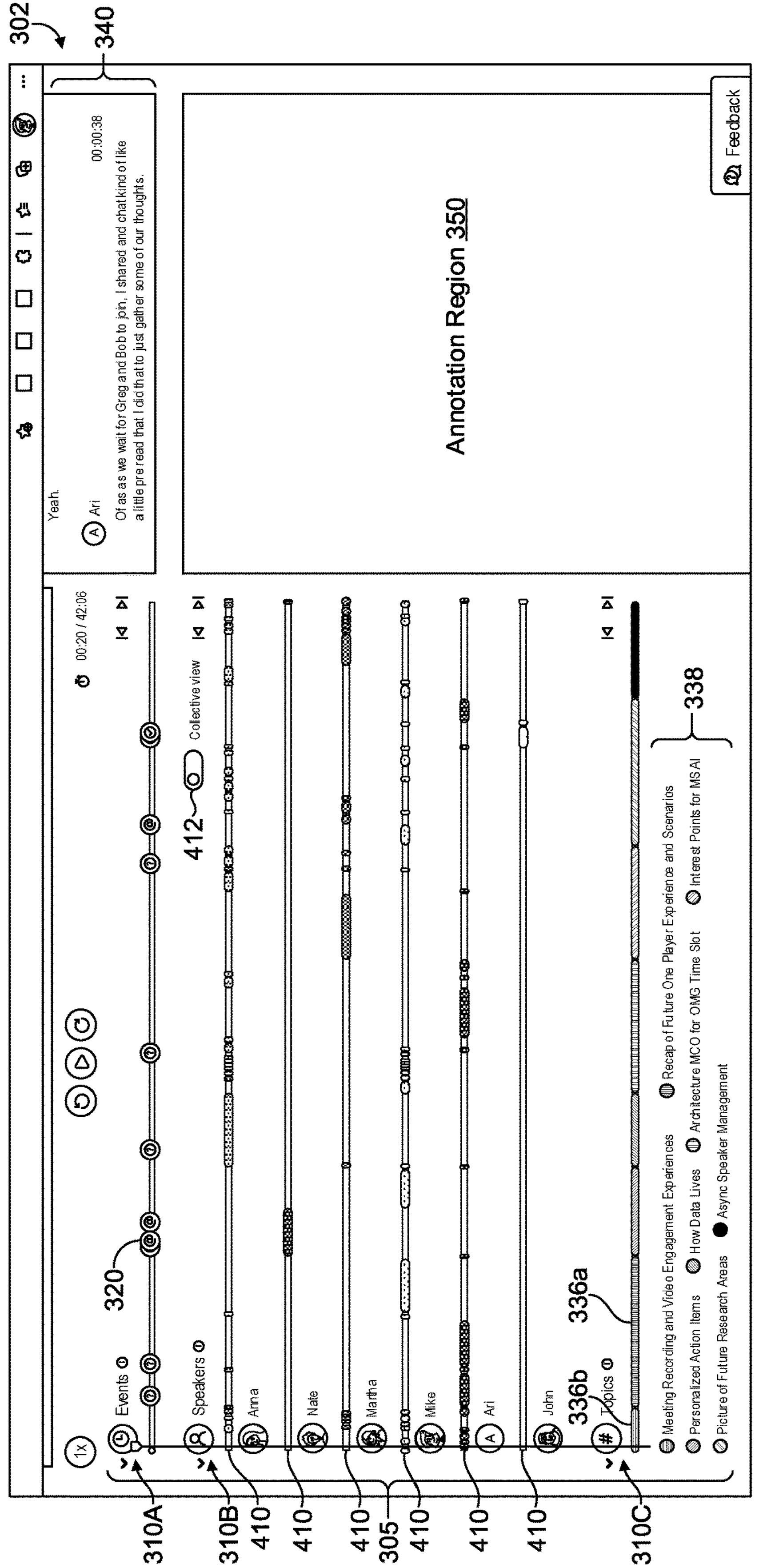
FIG. 4 illustratively depicts an example schematic screenshot from a personal computing device showing aspects of an example graphical user interface, in accordance with an embodiment of the present disclosure.
Figure 5:
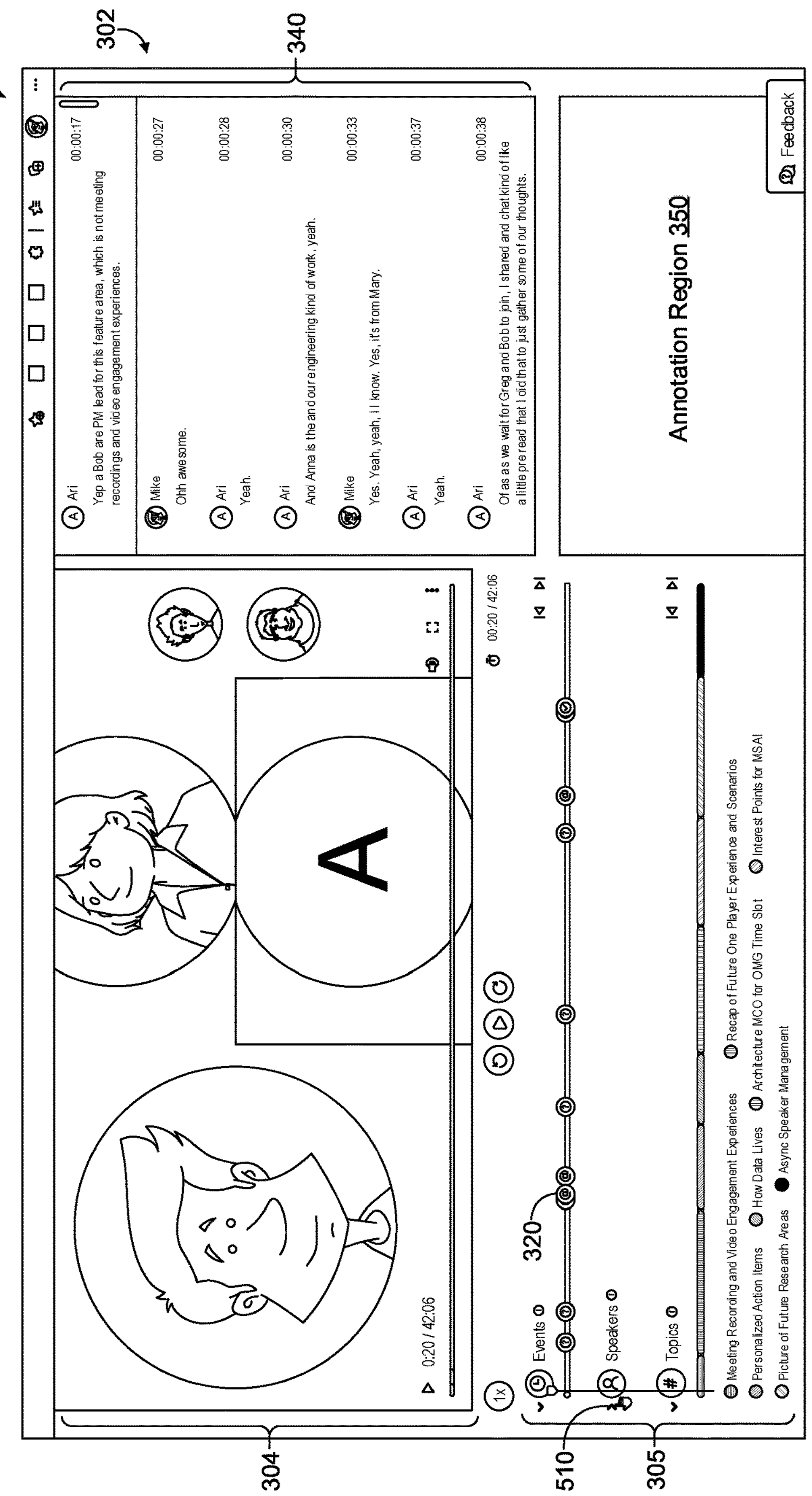
FIG. 5 illustratively depict example schematic screenshots from a personal computing device showing aspects of example graphical user interfaces, in accordance with an embodiment of the present disclosure.

In some embodiments, the types of events of interest to be provided and/or the number of each type of information item provided are determined by enriched meeting playback timeline assembler 270 based on the context of the user. For instance, as described previously, the user-meeting data associated with the user, which indicates the user's context, can include information indicating a particular computing application being used by the user to access a meeting or meeting recording. Thus, the information about the particular computing application may be used by enriched meeting playback timeline assembler 270 to determine how much user-meeting data to provide, a suitable size for the enriched meeting playback timeline (relative to a display size), how many events of interest to provide, and/or which type(s) of events of interest to provide to the user. For example, if the computing application includes a GUI presented by a desktop, laptop, or virtual/reality (VR) computing device such as depicted in FIGS. 3-5, then enriched meeting playback timeline assembler 270 provides a greater amount of events of interests (as compared to if the enriched meeting playback timeline was being displayed on a mobile or tablet device), as the computing device would determine that display size can display more information (based on a ratio of the enriched meeting playback timeline to the entire screen area). In contrast, if the computing application includes a GUI generated by a mobile or table computing device, then enriched meeting playback timeline assembler 270 may provide less events of interests (as compared to if the enriched meeting playback timeline was being displayed on a desktop/laptop/VR device), as the computing device would determine that display size is limited in size, which limits the information that may be displayed (based on a ratio of the enriched meeting playback timeline to the entire screen area). Further, displaying fewer events of interests may correspond to less functionality, such as that the pop-up window 360 of FIG. 3 may be omitted instead of being displayed when a user hovers over the corresponding event of interest.

Similarly, in some instances, the events of interest is formatted by enriched meeting playback timeline assembler 270 for presentation to the user based on a particular computing application being used by the user to access a meeting recording. As a first example, where a first user context comprises the user interacting with a chat region of an online meeting application during a meeting (for instance, the user inputting a question into the chat), the alphanumeric characters (typed into or spoken into the chat region) are stored as the user-meeting data that is accessed by the event of interest generator 260 (for example, the annotations determiner 266) to generate enriched meeting data 280 accessed by the enriched meeting playback timeline assembler 270 to display the event of interest based on the chat.

As a second example, where a second user context comprises the user interacting with a meeting recording having at least a threshold number speakers (for example, two speakers), then the enriched meeting playback timeline assembler 270 generates an enriched meeting playback timeline having visually distinct segments corresponding to each speaker. Alternatively or additionally, the enriched meeting playback timeline assembler 270 may generate an enriched meeting playback sub-timeline corresponding to each speaker (for example, identified by the speaker determiner 264). As illustrated in FIG. 4, the enriched meeting playback sub-timeline may include segments corresponding to a respective speaker and a horizontal timeline having a start and end time that matches the enriched meeting playback timeline. However, unlike the enriched meeting playback timeline, the enriched meeting playback sub-timeline may only include at least one segment indicating a portion of the meeting recording during which the speaker was speaking. In one embodiment, the enriched meeting playback timeline assembler 270 assembles the event of interest spoke by a speaker on the enriched meeting playback sub-timeline corresponding to the speaker in addition to or alternative to assembling the event of interest on the enriched meeting playback timeline. The order of the enriched meeting playback sub-timelines may be based on the ranking of the speakers (relative to the user), as discussed above.

As a third example, where a third user context comprises the user interacting with a meeting recording having at least a threshold number topics being covered (for example, two topics), then the enriched meeting playback timeline assembler 270 generates visually distinct segments (for example, identified by the topic/keyword determiner 268) along the enriched meeting playback timeline. A visually distinct indication may be assigned to each segment along the enriched meeting playback timeline where a speaker is speaking. As illustrated in FIG. 3, the enriched meeting playback timeline includes a plurality of visually distinct segments corresponding to different topics. In one embodiment, the enriched meeting playback timeline assembler 270 includes the visually distinct segment for each topic identified. In one embodiment, the enriched meeting playback timeline assembler 270 generates an enriched meeting playback sub-timeline corresponding a different topic. Although the embodiments illustrated in FIGS. 3-5 include segments that are visually distinct based on the pattern or shade inside the segment, it should be understood that in some embodiments, the segments may be visually distinct based on any visual indication, such as different colors, different shade of a color, different line thickness, and so forth.

Some embodiments of enriched meeting playback timeline assembler 270 assemble or format the events of interest on the enriched meeting playback timeline for consumption by a computing application or service. For example, as described previously, enriched meeting playback timeline assembler 270 determines a set of events of interest for a particular computing application (for example, mobile application, VR application, or desktop application). Some embodiments of the enriched meeting playback timeline assembler 270 use or generate presentation logic 235 to specify the formatting of events of interest, or to facilitate the formatting or presentation of events of interest to a user via a computing application or service. For example, presentation logic 235 specifies instructions to present one or more relevant events of interest to a user via a meeting application, and additionally present enriched meeting playback sub-timelines that have been ranked based on selection of an expansible control. Similarly, presentation logic 235 may specify presentation content to present in a stream region based on selection of an event of interest or other portion on the enriched meeting playback timeline. For example, in response to receiving selection of an event of interest, the presentation component 220 causes the stream region to change the meeting recording to the time during which the event of interest occurred, based on the presentation logic 235. In this manner, a user is able to quickly identify events of interest, select a target event of interest, which then causes the presentation component 220 to cause presentation of the corresponding portion of the meeting recording to more quickly deliver desirable information to the user, enhancing the user experience and reducing resources associated with a user having to watch the entire meeting recording.

Continuing with FIG. 2, example system 200 includes one or more enriched meeting end-user application(s) 290, which comprise computer applications or services that provide improved user computing experiences, for example, to facilitate consumption, by an end-user, of aspects of the embodiments disclosed herein. Examples of enriched meeting end-user application(s) 290 include, without limitation, content personalization services, user intent inference services, automatic speech recognition services, device power management services, and semantic understanding services.

In particular, a first example enriched meeting end-user application(s) 290 comprises content personalization services. In one embodiment, a content personalization engine 291 is provided to facilitate providing a personalized user experience. Thus, content personalization engine 291 is one example of an application or service (or set of applications or services) that consumes enriched information about one or more meetings to provide personalized meeting content to a user, as determined by implementations of the present disclosure.

At a high level, example content personalization engine 291 is responsible for generating and providing aspects of personalized user experiences, such as personalized content or tailored delivery of content to a user. In some embodiments, the content is provided as part of an application programming interface (API) where it is consumed by yet another application or service. In one example of providing personalized content, where a user's calendar (or other user data such as email) indicates that a user has an exam, the user is automatically provided with meeting recordings that include the enriched meeting playback timeline discussed herein. In one embodiment, the lecture recordings are provided for courses that the user is currently signed up for, and the events of interest in these lecture recordings are determined, based on user activity pattern information, which includes the user's browsing habits during final exam months.

In some embodiments, content personalization engine 291 tailors content for a user to provide a personalized user experience. For example, content personalization engine 291 generates a personalized enriched meeting playback timeline to be presented to a user, which is provided to presentation component 220. Alternatively, in other embodiments, content personalization engine 291 generates events of interest on the enriched meeting playback timeline and makes it available to presentation component 220, which determines when and how (for example, what format) to present content based on user-meeting data. For example, if a user-meeting data indicates the user is likely to be studying for final exams when it is relevant to present a particular GUI (for example, GUI 302 of FIG. 3), it may be appropriate to provide that GUI in a pop-up window format, thus personalizing it to the context of the user. In some embodiments, other services or applications operating in conjunction with presentation component 220 determine or facilitate determining when and how to present personalized content. For example, the personalized content is stored in the user profile 240 or the enriched meeting data 280.

Other examples of enriched meeting end-user application(s) 290 include, without limitation, at least one of: (a) a recommendation service that suggests new content to a user based on user patterns and contextual information. For example, a user activity pattern indicates that a user watches meeting recordings related to physics every Monday night. Contextual information indicates that the user prefers speakers or topics within physics (such as relativity). Accordingly, on a given Monday night, a recommendation is provided to the user to watch a meeting recording related to physics having a style similar to the user's taste. (b) A user has an activity pattern of going to conferences covering professional topics relevant to the user's profession. A personal assistant application service monitors upcoming conferences and determines that a conference relevant to the user's profession will be hosted near the user. The personal assistant application automatically purchases a ticket for the user when the tickets first become available. Alternatively, the personal assistant service checks the user's calendar to determine that the user is available on the date of the conference, and then prompts the user, notifying the user about the conference, and in some embodiments, asking if the user wants to personal assistant service to purchase a ticket. Thereafter, the meeting recording from the conference may be downloaded including the enriched meeting playback timeline discussed herein. (c) A user has an activity pattern of watching meeting recordings on Thursday nights. A personal assistant service determines that a user reads certain genres of books, based on information about book purchases and/or e-reader activity by the user. For example, based on the user's taste in books, a meeting recording is recommended to the user that the user likely will enjoy. The recommended meeting recording may be automatically downloaded in a manner to preserve bandwidth in advance of Thursday night. As part of the download, events of interest and an enriched meeting playback timeline may be generated for the downloaded meeting recording. (d) A user may be studying for exam, such that a streaming application plays back sections of a lecture that correspond to section during the lecture when the professor is speaking, when a particular topic is discussed, or when a question is asked. In some embodiments, the topics are suggested based on the interest of the user, based on a topic or subject of upcoming meetings, or based on requests received via email. For example, a user's boss asks the user a question about a topic or asks the user to present on the status of a project, and a customized meeting playback is generated based on the topic of the question or based on discussion of the project in recent meetings.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or in the cloud.

As shown in example system 200, storage 225 includes event of interest determination logic 230 and presentation logic 235, as described previously. Storage 225 also includes an example embodiment of a user profile 240 and an enriched meeting data 280. Example user profile 240 includes information about user accounts and devices 242, user-meeting data 244, and user configurations/settings 246. In some embodiments, the information stored in user profile 240 is available to other components of example system 200.

User accounts and devices 242 generally includes information about user devices accessed, used, or otherwise associated with a user, and/or information related to user accounts associated with the user, which may be used for accessing or collecting user data for a user (such as a user interacting with a group or a group member). For example, information of user accounts and devices 242 comprises at least one of: online or cloud-based accounts (for example, email, social media) such as a Microsoft® MSA account or a Microsoft 365 account; other accounts such as entertainment or gaming-related accounts (for example, Xbox®, Netflix®, online game subscription accounts, or similar account information); people data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, the information stored in user accounts and devices 242 may be determined from meeting-data collection component 210 or user activity monitor 250 (including one or more of its subcomponents).

As described previously, user-meeting data 244 generally includes information about a user associated with the user profile 240. In one embodiment, user-meeting data 244 includes user data received from meeting-data collection component 210 or user data determined by user activity monitor 250 (or its subcomponents), which includes user-related activity data, a context or contextual information, and user data features (or structured or semi-structured user data), in some embodiments. User-meeting data 244 also may include information regarding a transcript of spoken content delivered during the meeting, or a chat transcript of messages exchanged privately or publicly during the meeting. User-meeting data 244 also may include information regarding the user's interactions with one or more meetings or meeting recordings, such as the number of interactions, frequency, or other data regarding the interactions the user had during the meeting that are relevant to the user, in some embodiments.

User configurations/settings 246 generally include user settings or preferences associated with embodiments described herein. By way of example and not limitation, such settings include user configurations or preferences about the various thresholds described herein, confidence values associated with inferences, explicitly defined settings regarding user data used to determine an event of interest, preferences regarding events of interest that are provided to the user, preferences or configurations regarding the presentation of the enriched meeting playback timeline (and the enriched meeting playback sub-timeline) by computing applications and services used by the user, or other preferences or configuration settings for any of the embodiments described herein.

Example enriched meeting data 280, in general, comprises information about the event of interest determined by the event of interest generator 260, data associated with the enriched meeting playback timeline assembler 270, and any suitable data helpful in generating the interfaces of FIGS. 3-5. In one embodiment, the presentation component 220 receives the enriched meeting data 280 to generate the interfaces of FIGS. 3-5. For example, the enriched meeting data 280 includes data associated with the ranked events of interest, the enriched meeting playback timeline, the enriched meeting playback sub-timelines, the distinct visual indications assigned to the segments of the enriched meeting playback timeline and sub-timelines.

Example system 200 includes a presentation component 220 that is generally responsible for presenting content including aspects of the event of interest, such as events of interest determined by event of interest generator 260, and that works in conjunction with enriched meeting playback timeline assembler 270. The content may be presented via one or more presentation components 916, as described in FIG. 9. Presentation component 220 may comprise one or more applications or services on a user device across multiple user devices or in the cloud. For example, in one embodiment, presentation component 220 manages the presentation of events of interest to a user across multiple user devices associated with that user, or uses presentation logic determined by enriched meeting playback timeline assembler 270, which the user accesses via a mobile device, laptop device, or VR headset, and so forth. For example, presentation component 220 determines on which user device(s) content is presented and/or how much content is presented, presents the events of interest generated by the event of interest generator 260, presents the enriched meeting playback timeline generated by the enriched meeting playback timeline assembler 270, presents the enriched meeting data 280, and/or presents any data associated with any other components of system 200. Presentation component 220 presents enriched meeting data 280, including any substitutions, reorganizations, or highlights as directed by presentation logic 235 or by enriched meeting playback timeline assembler 270. In some embodiments, presentation component 220 can present events of interests, proactively and dynamically, such as that when a user interacts with (for example, selects) an event of interest from the enriched meeting playback timeline, the presentation component 220 causes a stream region to present the portion of the meeting corresponding to when the interacted upon event of interest. For example, presentation component 220 determines when, whether, and how to present the meeting recording based on a user selection of an event of interest, based on a context, and/or based on presentation logic 235 or enriched meeting playback timeline assembler 270.

Some embodiments of presentation component 220 can determine how many events of interest should be presented to a user. Alternatively, presentation logic 235 may specify for presentation component 220, or enriched meeting playback timeline assembler 270 may instruct presentation component 220 how many events of interest, if any, should be presented to a user. This determination can be made, for example, based upon the user device's screen size (with potentially more or differently formatted events of interest presentable on, for instance, a laptop computer, as compared to a mobile phone) or the surface on which the event of interest will be presented (for example, a calendaring application, communication platform, or other application or program) such as described previously. The presentation component 220 can present, via a graphical user interface ("GUI"), in a number of different formats and applications, such as those shown in FIGS. 3, 4, and 5 (discussed further below). In one embodiment, presentation component 220 generates user interface elements associated with or used to facilitate presenting events of interest (such as shown in connection with FIGS. 3, 4, and 5). Such elements can include icons or indicators, graphics buttons, sliders, menus, audio prompts, alerts, alarms, vibrations, pop-up windows, notification-bar or status-bar items, in-app notifications, queries, prompts, or other similar features for interfacing with a user.

With reference now to FIGS. 3, 4, and 5, a number of example schematic screenshots from a personal computing device are illustratively depicted, showing aspects of example graphical user interfaces (GUIs) that include presentation of various enriched meeting playback timelines having events of interest, as described herein. The example events of interest shown in FIGS. 3, 4, and 5 are determined for a particular user and contextualized for a user, such as described in connection with the components of system 200 of FIG. 2. The example events of interest are determined by event of interest generator 260, and the example enriched meeting playback timeline are generated based on enriched meeting playback timeline assembler 270 and presentation component 220 of FIG. 2.

Turning to FIG. 3, an example schematic screen display 300 is shown, which represents a computing device, such as user device 102*n*, discussed above with respect to FIG. 1. Screen display 300 is shown having a GUI 302, which could be produced on the computing device screen display 300 by any of a number of different computer programs, applications or other displays discussed herein. In some embodiments, the GUI 302 includes a stream region 304 and an enriched timeline region 305. The stream region 304 displays the recording of the meeting recording. The stream region 304 is capable of playing back a video stream that has been formatted as MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video formatted file.

To facilitate navigating to various portions of the meeting recording and to facilitate tracking progression through the video, the stream region 304 may include a timeline 306 that includes a play indicator 308 that is selectable to pause and continue playing the meeting recording presented on the stream region 304. Additionally, the timeline 306 may have a length that corresponds to a duration of the meeting recording. For example, the leftmost side corresponds to a start of the meeting and the rightmost side corresponds to an end of the meeting recording. A user may navigate to any portion of the meeting recording by selecting a point between the leftmost end and the rightmost end of the timeline 306.

To better help a user navigate to a particular portion of the meeting recording that is of interest, the example GUI 302 includes an enriched meeting playback timeline 310 in the enriched timeline region 305. In the illustrated embodiment, the GUI 302 includes a first enriched meeting playback timeline 310A corresponding to events of interest, a second enriched meeting playback timeline 310B corresponding to speakers, and a third enriched meeting playback timeline 310C corresponding to topics. In one embodiment, the enriched meeting playback timelines 310 has a length substantially matching a length of the timeline 306, such that the leftmost side of the enriched meeting playback timeline 310 also corresponds to a start of the meeting recording, and the rightmost side of the enriched meeting playback timeline 310 corresponds to an end of the meeting recording. In this manner, indications along the enriched meeting playback timeline 310 may correspond to an event time along the timeline 306 and enriched meeting playback timeline 310.

First, the first enriched meeting playback timeline 310A may include at least one event of interest 320 having a position along the enriched meeting playback timeline 310A that corresponds to an event time during which the event of interest 320 occurred. In one embodiment, the event of interest 320 presented on the first enriched meeting playback timeline 310A has a different indication for each category or type of event of interest. For example and as illustrated, an event of interest (determined by the question determiner 269 of FIG. 2) corresponding to a question is presented as an indication having a "?" symbol, an event of interest (determined by the mentions determiner 262 of FIG. 2) corresponding to a mention of a user is presented as an indication having a "@" symbol, and an event of interest (determined by the topic/keyword determiner 268 of FIG. 2) corresponding keyword is presented as an indication having a checkmark "✓" symbol. In some embodiments, an action item is generated for a corresponding event of interest.

Second, the second enriched meeting playback timeline 310B may include speaker segments 328 having distinct visual indications corresponding to each speaker identified during the meeting recording. In one embodiment, the speaker segments 328 presented on the second enriched meeting playback timeline 310B correspond to events of interest, such as a speaker (determined by the speaker determiner 264 of FIG. 2). In one example, the speaker segments 328 has a visually distinct indication for each speaker. The length of the speaker segment 328 may correspond to a duration during the meeting during which the speaker was speaking. For example, as illustrated, the portion of the meeting during which Anna was speaking is indicated by speaker segment 328A, the portion of the meeting during which Martha was speaking is indicated by speaker segment 328B, and so forth. In one embodiment, speaker segment 328A is longer than speaker segment 328B because Anna spoke longer than Martha, as indicated by the longer speaker segment associated with Anna. The second enriched meeting playback timeline 310B may include a legend 330 that visually correlates the distinct visual indication to a corresponding speaker. For example, Anna is shown as an icon having a particular pattern, which matches the pattern of the corresponding segment, in this example, speaker segment 328A. In this manner, a user may quickly reference the legend 330 to determine which visually distinct indication corresponds to a respective speaker.

Third, the third enriched meeting playback timeline 310C may include topic segments 336 having distinct visual indications corresponding to each topic identified during the meeting recording. In one example, the topic segments 336 presented on the third enriched meeting playback timeline 310C corresponds to events of interest, such as a topic (determined by the topic/keyword determiner 268 of FIG. 2). The topic segments 336 may have a different visual indication for each topic. The length of the topic segments 336 may correspond to a portion of the meeting during which the corresponding topic was covered. For example, as illustrated, the portion of the meeting during which the "Recap of Future" topic was discussed is indicated by segment 336A, the portion of the meeting during which "Video Engagement Experiences" topic was discussed is indicated by segment 336B, and so forth. In one embodiment, segment 336A is longer than segment 336B because the duration during which "Recap of Future" topic was discussed is longer that the duration during which the "Video Engagement Experiences" was discussed, as indicated by the longer segment associated with the "Recap of Future" topic. The second enriched meeting playback timeline 310B may include a topic legend 338 that visually correlates the distinct visual indication to a corresponding topic. For example, the "Recap of Future" topic is shown as an icon having a particular pattern, which matches the pattern of the corresponding segment, in this example, segment 336A. In this manner, a user may quickly reference the legend 338 to determine which visually distinct indication corresponds to a corresponding topic.

In one embodiment, the GUI 302 includes a transcript region 340. The transcript region 340 displays a transcript associated with content playing back on the stream region. In particular, the transcript region 340 may include alphanumeric characters correlating to the audio presented in the stream region 304. Alternatively or additionally, the transcript region 340 includes text corresponding to a chat that was active during the meeting. For example, the transcript region 340 generates a live transcript of the audio associated with the meeting recording playing in the stream region 304. In one embodiment, the transcript region 340 presents audio that has been indexed based on a speaker (as determined by the speaker determiner 264 of FIG. 2). In this manner and as illustrated in the transcript region 340, a block of text and associated timestamps may be presented proximate to text identifying the speaker.

In some embodiments, the user makes a selection on the GUI 302 to cause the stream region 304 to cause playback of the meeting recording based on the selection. As a first example, a user selects an indication corresponding to an event of interest 320 from the first enriched meeting playback timeline 310A to cause the stream region 304 to present the portion of the meeting recording corresponding to the selected event of interest. As a second example, the user selects an indication corresponding to a speaker from the second enriched meeting playback timeline 310B to cause the stream region 304 to present the portion of the meeting recording corresponding to the selected speaker. As a third example, the user selects an indication corresponding to a topic from the third enriched meeting playback timeline 310C to cause the stream region 304 to present the portion of the meeting recording corresponding to the selected topic. As a fourth example, the user selects a speaker or text from the transcript region 340 to cause the stream region 304 to present the portion of the meeting recording corresponding to the selected speaker or text.

In some embodiments, a user is able to manually add events of interest, in addition or alternatively, to those automatically presented on the enriched meeting playback timeline 310. The events of interest may be automatically added in response to a user selection (for example, a right click) on the enriched meeting playback timeline 310, as discussed with respect to the annotations determiner 266 of FIG. 2. For example, while watching the meeting recording, the user notices an event of interest being discussed. To manually create an indication of an event of interest corresponding to the topic being discussed, the user may input a selection or any other input, such as a string of alphanumeric characters (such as: "#?" to indicate that the user wants to tag a question that recently occurred as an event of interest, "#@" to indicate that the user wants to tag a mention that recently occurred as an event of interest, "#exam" to indicate that the user wants to tag a phrase containing the word "exam" and related synonyms as an event of interest). In one embodiment, the GUI 302 includes an annotation region 350 in which a user can specify parameters of the manually created event of interest. For example, the annotation region includes drop-down menus, windows, text fields, and so forth, to specify a name, a type (for example, mention, speaker, topic, question, and so forth), an event time (for example, a start and end time), and so forth.

As may be appreciated by a person having ordinary skill in the art, a user selection of an event of interest from the enriched meeting playback timeline 310 causes the meeting recording on the stream region 304 to navigate to the portion/time of the meeting recording during which the selected event of interest was discussed. The enriched meeting playback timeline 310 may present a pop-up window 360 including information associated with an event of interest. For example and as illustrated, in response to receiving a hovering input over an event of interest, a computing devices causes a pop-up window to be presented, such that the pop-up window includes a summary associated with the corresponding event of interest. In one embodiment, the summary of the pop-up window 360 includes enriched meeting data 280 of FIG. 2 or any data output by the event of interest generator 260 of FIG. 2. The pop-up window 360 may include selectable controls for providing feedback.

FIG. 4 illustratively depicts an example schematic screenshot 402 from a personal computing device showing aspects of an example GUI 302, in accordance with an embodiment of the present disclosure. Whereas the example screenshot of FIG. 3 includes the second enriched meeting playback timeline 310B having the segments 328 on a common timeline, the example screenshot 402 of FIG. 4 includes a plurality of enriched meeting playback sub-timelines 410 each having one or more segments corresponding to a different speaker. To facilitate toggling between second enriched meeting playback timeline 310B and the illustrated plurality of enriched meeting playback sub-timelines 410, the GUI 302 includes a view toggle control 412. In one embodiment, the enriched meeting playback timeline is expandable to cause presentation of the enriched meeting playback sub-timelines. Selection of the view toggle control 412 causes the GUI 302 to transition between displaying an enriched meeting playback timeline 310 of FIG. 3 and the plurality of enriched meeting playback sub-timelines. In this example, each enriched meeting playback sub-timeline corresponds to a respective speaker. In one embodiment, the plurality of enriched meeting playback sub-timelines 410 replace the enriched meeting playback timeline 310. In one embodiment, the plurality of enriched meeting playback sub-timelines 410 are ranked based on presentation logic 235 of FIG. 2.

Although the view toggle control 412 is only included in association with the second enriched meeting playback timeline 310B, it should be understood that in some embodiments, the view toggle control 412 may additionally or alternatively be included in association with any enriched meeting playback timeline, such as the first and/or third enriched meeting playback timelines 310A, 310C. In this manner, selection of the view toggle control may cause the GUI 302 to change display of the enriched timeline region between display of a corresponding enriched meeting playback timeline 310 and display of a plurality of enriched meeting playback sub-timelines 410. In one embodiment, changing display includes replacing the enriched meeting playback timeline 310 with the plurality of enriched meeting playback sub-timelines 410.

FIG. 5 illustratively depicts an example schematic screenshot 502 from a personal computing device showing aspects of an example GUI 302, in accordance with an embodiment of the present disclosure. Whereas the example screenshots of FIGS. 3 and 4 includes the second enriched meeting playback timeline 310B of FIG. 3 and the plurality of enriched meeting playback sub-timelines 410 of FIG. 4, the example screenshot 502 of FIG. 5 omits the second enriched meeting playback timeline 310B of FIG. 3 and the plurality of enriched meeting playback sub-timelines 410 of FIG. 4. In one embodiment, the GUI 302 includes a expansible control 510, that when selected, hides or shows the corresponding enriched meeting playback timeline 310 and/or the plurality of corresponding enriched meeting playback sub-timelines 410. By hiding the enriched meeting playback timeline 310 and/or the plurality of enriched meeting playback sub-timelines 410, the size of the enriched timeline region 305 can be reduced to save display space for the other regions (for example, the stream region 304, the transcript region 340, and the annotation region 350).

Figure 6:
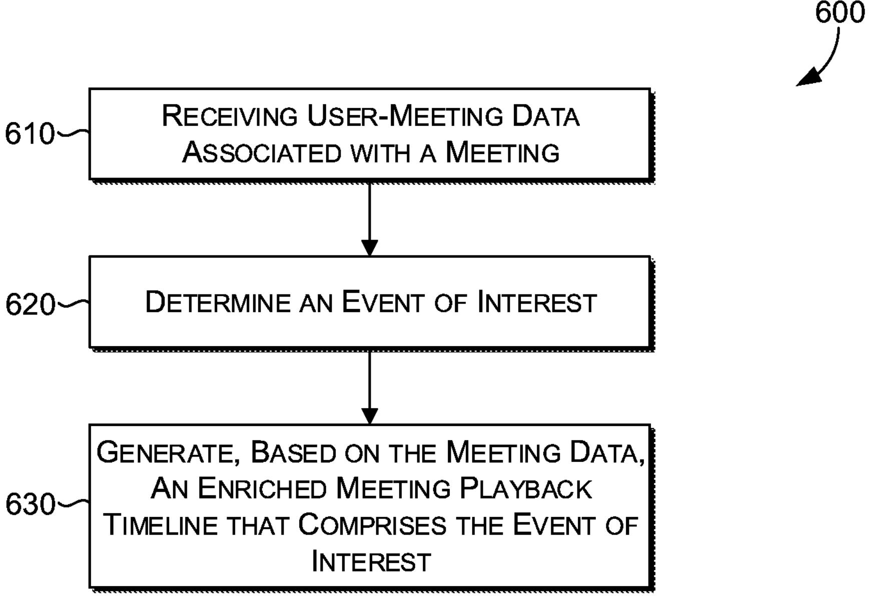
FIG. 6 depicts a flow diagram of a method for programmatically generating an enriched meeting playback timeline that includes an event of interest, in accordance with an embodiment of the present disclosure.
Figure 7:
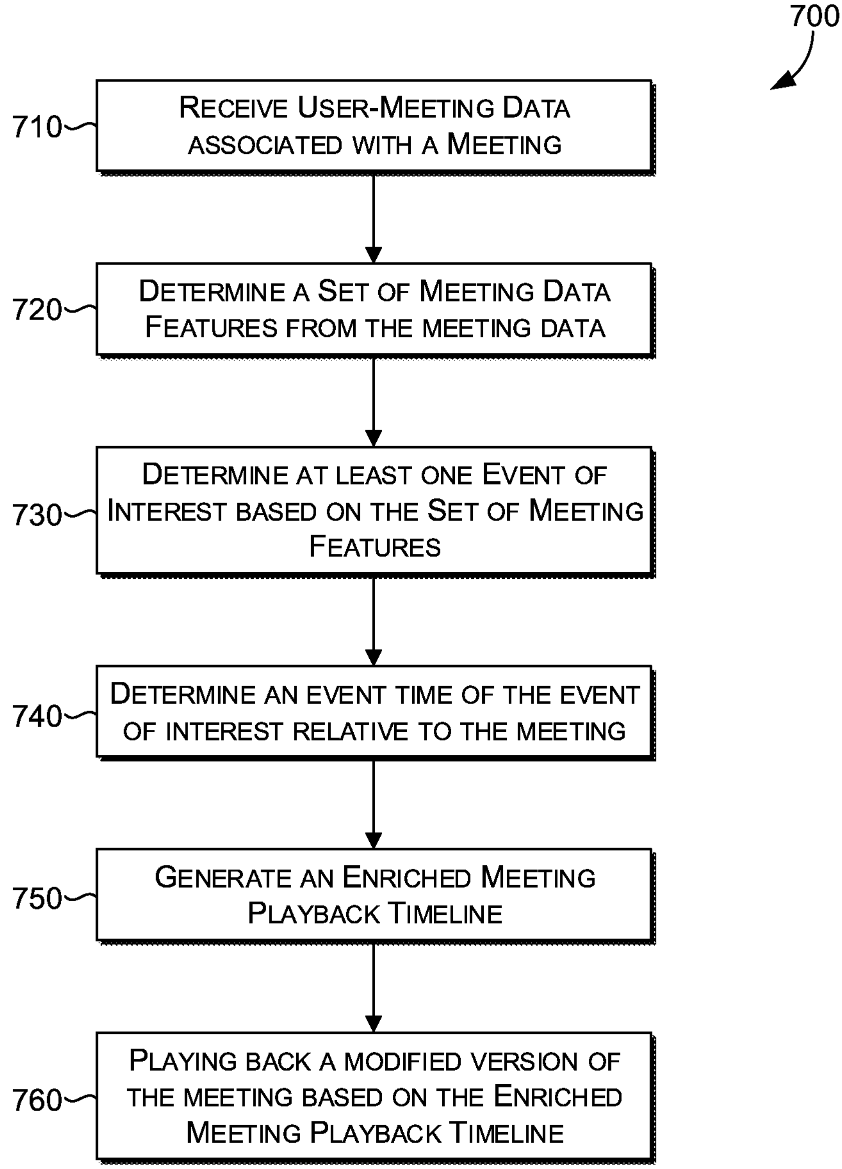
FIG. 7 depicts a flow diagram of a method for programmatically playing back a modified version of a meeting recording based on the enriched meeting playback timeline, in accordance with an embodiment of the present disclosure.
Figure 8:
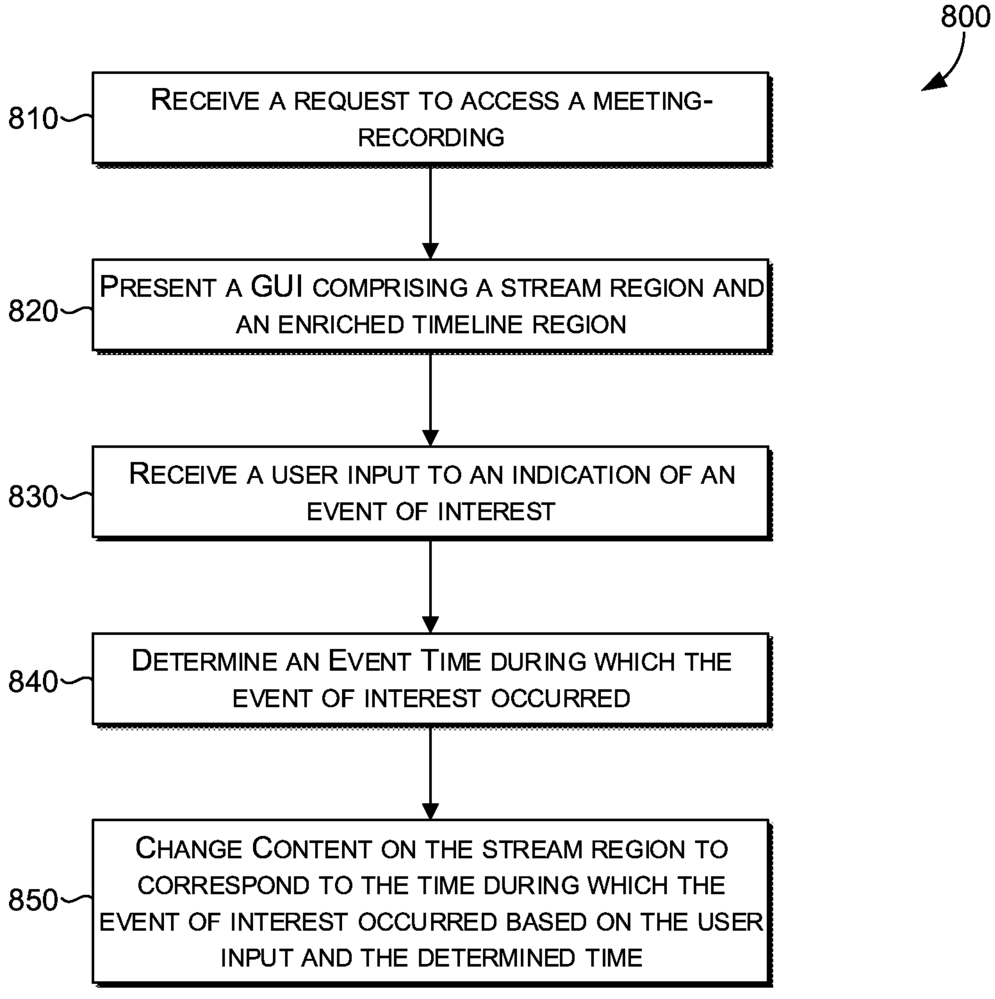
FIG. 8 depicts a flow diagram of a method for programmatically changing content on a stream region of a graphical user interface to correspond to the time during which the event of interest occurred, in accordance with an embodiment of the present disclosure.

Turning now to FIGS. 6, 7, and 8, aspects of an example process flows 600, 700, and 800 are illustratively depicted for some embodiments of the disclosure. Process flows 600, 700, and 800 each comprise a method (sometimes referred to herein as method 600, 700, and 800) that may be carried out to implement various example embodiments described herein. For instance, at least one of process flows 600, 700, or 800 are performed to programmatically determine events of interest or generate enriched meeting playback timeline(s) for a user by processing user-meeting data, which are used to provide any of the improved electronic communications technology or enhanced user computing experiences described herein.

Each block or step of process flow 600, process flow 700, process flow 800, and other methods described herein comprises a computing process that may be performed using any combination of hardware, firmware, and/or software. For instance, various functions are carried out by a processor executing instructions stored in memory, such as memory 912 described in FIG. 9 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. For example, the blocks of process flow 600, 700, and 800 that correspond to actions (or steps) to be performed (as opposed to information to be processed or acted on) are carried out by one or more computer applications or services, in some embodiments, which operate on one or more user devices (such as user device 102*a* of FIG. 1), servers (such as server 106 of FIG. 1), and/or are distributed across multiple user devices, and/or servers, or by a distributed computing platform, and/or are implemented in the cloud, such as described in connection with FIG. 10. In some embodiments, the functions performed by the blocks or steps of process flows 600, 700, and 800 are carried out by components of system 200, as described in connection to FIG. 2.

With reference to FIG. 6, aspects of example process flow 600 are illustratively provided for generating an enriched meeting playback timeline 310 of FIG. 3, and, in some embodiments, determining an event of interest to include in the enriched meeting playback timeline. In one example, example process flow 600 is performed to generate the enriched meeting playback timeline illustrated in FIG. 3 and as described in connection with FIG. 2.

At a block 610, method 600 includes receiving user-meeting data associated with a meeting. Embodiments of block 610 perform operations including receiving user-meeting data, as discussed in FIG. 2, with respect to the meeting-data collection component 210 and the user activity monitor 250. In particular, user-meeting data may include any data associated with the user and a meeting attended by the user, an example of which includes meeting information, transcript information, contact information, and other user or meeting-related data discussed herein.

At block 620, method 600 includes determining an event of interest. Embodiments of block 620 perform operations including determining whether a meeting or meeting recording includes an event of interest, such as a mention of a person or entity, a mention of a speaker, a keyword or particular topic, or a question being asked, to name a few. In some embodiments, the event of interest generator 260 of FIG. 2 determines (block 620) the events of interest as discussed with respect to FIG. 2.

At block 630, method 600 includes generating an enriched meeting playback timeline. In one example, the enriched meeting playback timeline includes the events of interest determined by embodiments of block 620. Embodiments of block 630 perform operations including generating the enriched meeting playback based on the user-meeting data received by embodiments of block 610. In one embodiment, generating the enriched meeting playback timeline includes generating the enriched meeting playback sub-timeline. In one embodiment, the enriched meeting playback timeline assembler 270 of FIG. 2 generates (block 630) the enriched meeting playback timeline, as discussed with respect to FIG. 2. In one embodiment, the enriched meeting playback timeline is indexed based on an event of interest as illustrated with respect to playback timelines 310B and 310C of FIG. 3.

With reference to FIG. 7, aspects of example process flow 700 are illustratively provided for playing back a modified version of the meeting as a meeting recording. Example process flow 700 is performed to playback a meeting recording based on an enriched meeting playback timeline, as described in connection with FIG. 2. Playback may be based on the event of interest generator 260, the enriched meeting playback timeline assembler 270, the enriched meeting data 280, and/or the enriched meeting end-user application 290, such as described in connection with FIG. 2.

At a block 710, method 700 includes receiving user-meeting data associated with a meeting or a user of a computing device. In one example, the user-meeting data associated with the user/meeting is received from one or more computing devices used by that user and/or from storage associated with that user, such as a user profile 240, described in connection with FIG. 2. Some embodiments of block 710 perform operations including receiving user-meeting data, as discussed in FIG. 2 with respect to the meeting-data collection component 210 and the user activity monitor 250. In particular, user-meeting data may include any data associated with the user and a meeting attended by the user, an example of which includes meeting information, transcript information, contact information, and other user or meeting-related data discussed herein. In particular, in some instances user-meeting data is processed to determine other user-meeting data, such as interpretive data. For example, the user data is processed to determine a context associated with the user or to infer the user's intent. Accordingly, user data received at block 710 can indicate (or be used to determine) a context or intent of the user. Further, in some embodiments of method 700, this user data can be used at block 720 to determine one or more meeting data features from the user-meeting data, at block 730 for determining events of interest that are relevant to the user, or at block 740 for determining an event time of the at least one event of interest.

Some embodiments of block 710 including using one or more sensors, as described previously, that are configured to determine the user-meeting data. For example, a sensor operating on (or associated with) the computing device, which includes a software-based sensor or monitor, detects certain user data associated with the user, such as data regarding a computing application being used by the user, or other user activity data. Further, in some embodiments, the user data is converted into structured data and/or user data features are extracted so that the structured user data or user data features are used in the operations of block 710 (or other operations of method 700) to determine, for example, and among other data, contextual data for the user and/or one or more meeting data features.

At block 720, method 700 includes determining at least one meeting data feature based on the user-meeting data. The meeting data features may include features indicative of, among other measurable properties, an identity of a speaker in the meeting recording, a verbal command uttered during a meeting or while watching the meeting recording, transcript content, chat content, an identity of a speaker, a duration of the meeting, a duration of pauses, a user annotation, a user input into a chat, and/or contextual metadata expressed as data features indicative of meeting invitees, meeting attendees, a type of meeting, and the like. In one embodiment, the meeting data features are extracted by the features determiner 256 of FIG. 2, as discussed above.

At block 730, method 700 includes determining at least one event of interest based on the at least one meeting data feature. In one embodiment, the at least one event of interest are determined based on a predictive or classification machine learning model trained and verified using the meeting data features. The at least one event of interest may be determined by the event of interest generator 260 (and subcomponents) of FIG. 2, as discussed above.

At block 740, method 700 includes determining an event time of the event of interest determined at block 730. As discussed herein, the event time corresponds to a time at which the event of interest occurred in the meeting. In one embodiment, the event time spans a length of time, such as a start time during which the event of interest was mentioned, an ending time during which discussion of the event of interest stopped. The event time may be determined in terms of meeting-recording duration. For example, for a meeting recording that is 5 minutes in duration during which an event of interest occurred 2 minutes from the start of the meeting recording, the event time corresponding to the event of interest may be 2 minutes. In one example, the event time is determined (block 740) as discussed above with respect to the user activity monitor 250, the event of interest generator 260, and/or the enriched meeting data 280.

At block 750, method 700 includes generating an enriched meeting playback timeline. As discussed herein, the enriched meeting playback timeline includes an indication corresponding to the at least one event of interest positioned along the enriched meeting playback timeline to correspond to a time at which the event of interest occurred (for example, a time at which the event of interest started and ended). In one embodiment, the enriched meeting playback timeline includes a plurality of enriched meeting playback sub-timeline that correspond to an event of interest, such as a speaker or topic. For example, as illustrated in FIG. 4, the enriched meeting playback timeline includes one enriched meeting playback sub-timeline for each speaker (or other event of interest). Moreover, several example aspects of the event of interest, the enriched meeting playback timeline, and the enriched meeting playback sub-timelines provided for presentation according to some embodiments of block 750 are illustratively depicted in FIGS. 3, 4, and 5, and described further in connection with these drawings.

At block 760, method 700 includes playing back a modified version of the meeting based on the enriched meeting playback timeline. Playing back a modified version of the meeting may include playing the meeting recording of the meeting, such that the meeting recording includes the enriched meeting playback timeline and the at least one event of interest. When a user accesses a meeting recording, a GUI 302 (FIG. 3) may be generated, including the stream region 304 (FIG. 3), the enriched timeline region 305 (FIG. 3), the transcript region 340 (FIG. 3), and the annotation region 350 (FIG. 3). In one embodiment, interacting with one region of the GUI 302 causes content on another region to change. For example, a user selects an event of interest from the enriched meeting playback timeline, which causes a computing device to change the portion of the meeting recording in the stream region 304 to correspond to a time along the meeting recording that corresponds to the event time determined in block 740.

Turning to FIG. 8, aspects of example process flow 800 are illustratively provided for changing content on the stream region to present content associated with the event of interest. Example process flow 800 may be performed to playback a meeting recording based on an enriched meeting playback timeline, as described in connection with FIG. 2. In one embodiment, playback is based on the event of interest generator 260, the enriched meeting playback timeline assembler 270, the enriched meeting data 280, and/or the enriched meeting end-user application 290, such as described in connection with FIG. 2.

At a block 810, method 800 includes receiving a request to access a meeting recording of a meeting. At block 820, method 800 includes presenting a GUI that includes a stream region 304 (FIG. 3) and an enriched timeline region 305 (FIG. 3). In one embodiment, the stream region 304 presents a stream of the meeting recording, and the enriched timeline region 305 includes the enriched meeting playback timeline or the plurality of enriched meeting playback sub-timeline. At block 830, method 800 includes receiving a user input indicative of selection of an event of interest. The user input may include a click or other user selection of an event of interest from the enriched meeting playback timeline.

At block 840, method 800 includes determining an event time during which the event of interest selected at block 830 occurred. As discussed herein, the event time corresponds to a time at which the event of interest occurred in the meeting. In one embodiment, the event time spans a length of time, such as a start time during which the event of interest was mentioned, an ending time during which discussion of the event of interest stopped. The event time may be determined in terms of meeting-recording duration.

At block 850, the method includes changing content on the stream region to correspond to the event time. In particular, at block 850, changing content on the stream region to correspond to the event time includes navigating the stream of the meeting recording to the time of the meeting recording during which the event of interest occurred based on the user input from block 830 and the determined event time from block 840. In one example, when a user accesses (block 810) a meeting recording, a GUI 302 (FIG. 3) is generated, including the stream region 304 (FIG. 3), the enriched timeline region 305 (FIG. 3), the transcript region 340 (FIG. 3), and the annotation region 350 (FIG. 3). Interacting with one region of the GUI 302 may cause content on another region to change. For example, a user selects an event of interest from the enriched meeting playback timeline, which causes a computing device to change (block 850) the portion of the meeting recording in the stream region 304 to correspond to a time along the meeting recording that corresponds to the event time.

Moreover, several example aspects of event of interest, the enriched meeting playback timeline, and the enriched meeting playback sub-timelines provided for presentation according to some embodiments of block 850 are illustratively depicted in FIGS. 3, 4, and 5, and described further in connection with these drawings.

Accordingly, we have described various aspects of technology directed to systems and methods for intelligently processing and presenting, on a computing device, group data that is contextualized for a user. It is understood that various features, sub-combinations, and modifications of the embodiments described herein are of utility and may be employed in other embodiments without reference to other features or sub-combinations. Moreover, the order and sequences of steps shown in the example methods 600 and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise receiving user-meeting data associated with a meeting recording and determining at least one meeting data feature from the user-meeting data. The operations further comprise, based at least in part on the at least one meeting data feature, determining at least one event of interest of the meeting recording. The operations further comprise determining an event time of the at least one event of interest relative to a timing of the meeting recording. The operations further comprise generating, for presentation via a graphical user interface (GUI), an enriched meeting playback timeline that comprises a timeline indicative of the at least one event of interest relative to the timing of the meeting recording and that comprises an indication, corresponding to the at least one event of interest, at a position on the enriched meeting playback timeline corresponding to the event time and that is selectable to cause the GUI to toggle presentation of the meeting recording to a time corresponding to occurrence of the at least one event of interest.

In any combination of the above embodiments of the system, the at least one meeting data feature is specific to a user and comprise at least one of: a user annotation, a user input into a chat field in an application associated with the meeting, meeting transcript content, an identity of a speaker in the meeting recording, a duration of the meeting recording, a duration of pauses in the meeting recording, a verbal command uttered during a meeting or while watching the meeting recording, or contextual metadata expressed as data features indicative of meeting invitees, meeting attendees, or a type of meeting.

In any combination of the above embodiments of the system, the user annotation comprises a word, phrase, letter, or symbol that is uttered by the user or entered into the chat field.

In any combination of the above embodiments of the system, the enriched meeting playback timeline is expandable to present a plurality of enriched meeting playback sub-timelines, each enriched meeting playback sub-timeline of the plurality of enriched meeting playback sub-timelines corresponding to a meeting speaker or a meeting topic.

In any combination of the above embodiments of the system, the operations further comprise ranking a plurality of meeting speakers or a plurality of meeting topics, wherein the plurality of enriched meeting playback sub-timelines are arranged on the GUI based on the ranking.

In any combination of the above embodiments of the system, the operations further comprise, in response to a selection of or a hovering selection over the indication of the at least one event of interest, presenting a pop-up window proximate to the indication of the at least one event of interest on the enriched meeting playback timeline, the pop-up window comprising a description of the at least one event of interest.

In any combination of the above embodiments of the system, the enriched meeting playback timeline comprises a plurality of segments, each segment of the plurality of segments corresponding to a portion of the meeting recording during which a corresponding speaker was speaking or during which a corresponding topic was covered.

In any combination of the above embodiments of the system, the enriched meeting playback timeline is expandable to present a plurality of enriched meeting playback sub-timelines, each enriched meeting playback sub-timeline of the plurality of enriched meeting playback sub-timelines corresponding to a different segment of the plurality of segments, wherein at least two segments of the plurality of segments are visually distinct from one another.

In any combination of the above embodiments of the system, determining the at least one event of interest comprises detecting an initial marking or wake-word, wherein the event time corresponds to a time when the initial marking or wake-word is detected; entering a monitoring mode of operation based on the detection of the initial marking or wake-word; and detecting a subsequent marking or word indicative of a type of event of interest during the monitoring mode of operation, wherein the indication corresponding to the at least one event of interest is generated based on the subsequent marking or word indicative of the type of event of interest.

In any combination of the above embodiments of the system, the operations further comprise generating an abbreviated meeting recording that includes, for each of the at least one event of interest of the meeting recording, a portion of the meeting recording occurring at the time of the event of interest.

In any combination of the above embodiments of the system, the at least one event of interest comprises at least one of a mention of the user, a start of a session of a speaker, a keyword mention, or a question being asked by an attendee of the meeting; and wherein the at least one event of interest is determine automatically by detecting the mention of the user, the start of the session of the speaker, the keyword mention, the question being asked, or a marking or word indicative of a type of event of interest.

In some embodiments, a computerized method is provided. The method comprises receiving, from a computing device, a user request to access a meeting recording. The method further comprises, subsequent to receiving the user request, presenting a graphical user interface (GUI) comprising a stream region and an enriched timeline region separate from the stream region, the enriched timeline region comprising a timeline comprising an indication corresponding to each event of interest of a plurality of events of interest that have been determined based on at least one meeting data feature from user-meeting data associated with the meeting recording. The method further comprises receiving, via the GUI, a first user input to a first indication of a first event of interest of the plurality of events of interest. The method further comprises determining a time during which the first event of interest occurred within the meeting recording. The method further comprises changing content on the stream region to correspond to the time during which the first event of interest occurred based on the first user input and the determined time.

In any combination of the above embodiments of the method, the method further comprises receiving, via the GUI, a user selection of a second indication that is positioned proximate to the enriched timeline region and that is selectable to present a plurality of enriched meeting playback sub-timelines associated with the timeline. The method further comprises changing content on the enriched timeline region to comprise the plurality of enriched meeting playback sub-timelines in response to receiving selection of the second indication, wherein each enriched meeting playback sub-timeline of the plurality of enriched meeting playback sub-timelines corresponds to a different speaker or a different topic.

In any combination of the above embodiments of the method, at least one enriched meeting playback sub-timeline of the plurality of enriched meeting playback sub-timelines comprises a corresponding indication of an event of interest of the plurality of events of interest, wherein the at least one meeting data feature is specific to the user and comprises at least one of: a user annotation, a user input into a chat field in an application associated with the meeting, meeting transcript content, an identity of a speaker in the meeting recording, a duration of the meeting recording, a duration of pauses in the meeting recording, a verbal command uttered during a meeting or while watching the meeting recording, or contextual metadata expressed as data features indicative of meeting invitees, meeting attendees, or a type of meeting.

In any combination of the above embodiments of the method, the method further comprises determining an event of interest of the plurality of events of interest based on a predictive model or a classification model, wherein the predictive model or the classification model determines the event of interest based on the at least one meeting data feature.

In any combination of the above embodiments of the method, the method further comprises filtering the plurality of events of interest to reduce a quantity of events of interest in the plurality of events of interest, wherein the enriched timeline region is presented based on the filtered plurality of events of interest.

In some embodiments, computer storage media is provided, such as any of the computer storage media described herein, that, when executed by at least one computer processor, causes computing operations to be performed. The operations comprise receiving user-meeting data associated with a meeting. The operations further comprise determining, from the user-meeting data, at least one meeting data feature that is specific to a user. The operations further comprise based at least on the at least one meeting data feature, determining at least one event of interest of the meeting. The operations further comprise determining an event time of the event of interest relative to a timing of the meeting. The operations further comprise generating, for presentation via a graphical user interface (GUI), an enriched meeting playback timeline that is a timeline indicative of the at least one event of interest relative to the timing of the meeting and that comprises an indication, corresponding to the event of interest, at a position on the enriched meeting playback timeline corresponding to the event time and that is selectable to cause the GUI to navigate presentation of the meeting to a time corresponding to occurrence of the event of interest.

In any combination of the above embodiments of the computer storage media, the operations for determining the at least one event of interest comprise detecting an initial marking or wake-word, wherein the event time corresponds to a time when the initial marking or wake-word is detected. The operations further comprise entering a monitoring mode of operation based on the detection of the initial marking or wake-word. The operations further comprise detecting a subsequent marking or word indicative of a type of event of interest during the monitoring mode of operation, wherein the indication corresponding to the at least one event of interest is generated based on the subsequent marking or word indicative of the type of event of interest.

In any combination of the above embodiments of the computer storage media, the enriched meeting playback timeline is expandable to present a plurality of enriched meeting playback sub-timelines that includes an indexed version of information included in the enriched meeting playback timeline.

In any combination of the above embodiments of the computer storage media, the enriched meeting playback timeline comprises a plurality of segments, each segment of the plurality of segments corresponding to a portion of the meeting during which a corresponding speaker was speaking or during which a corresponding topic was covered.

Example Computing Environments

Figure 9:
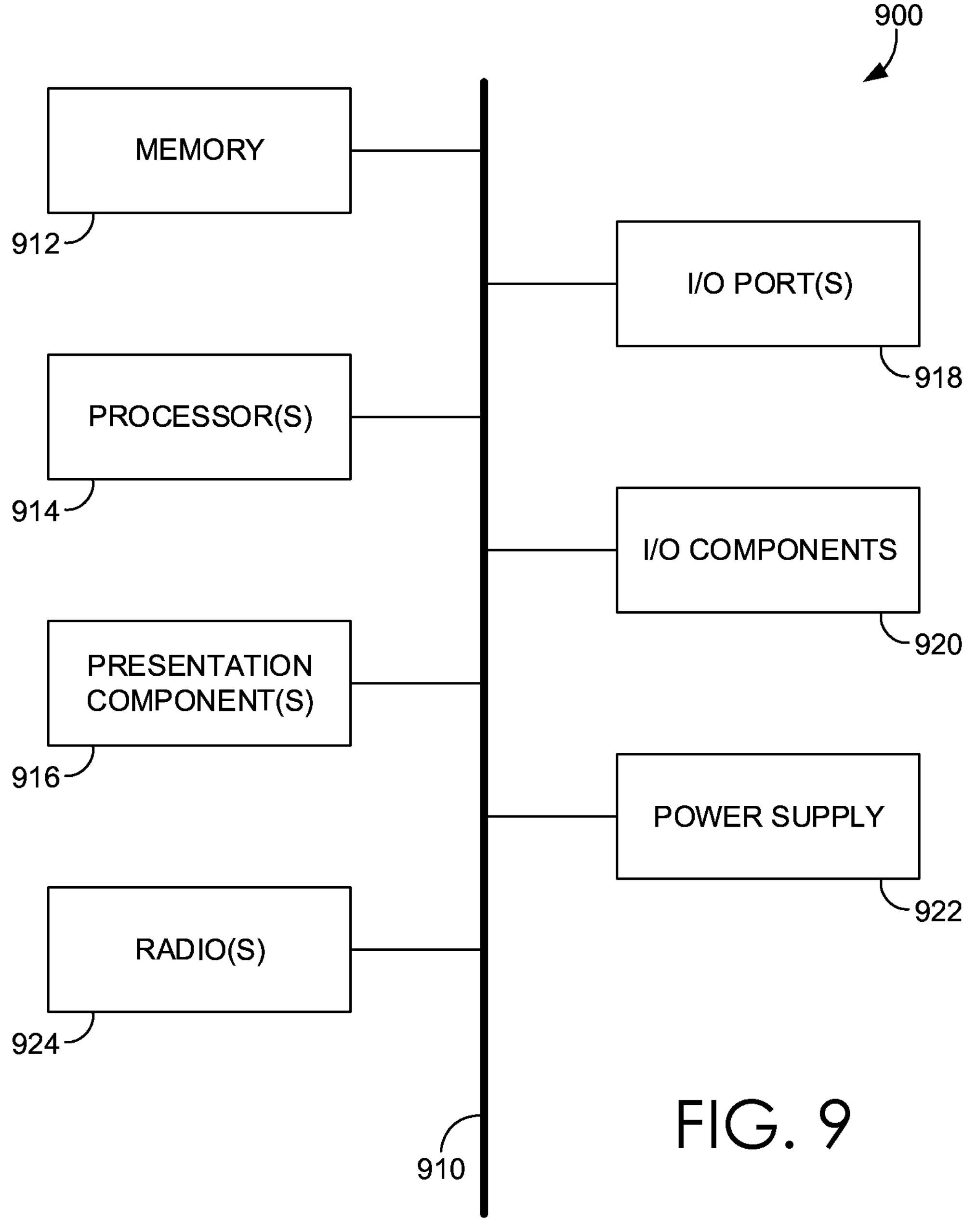
FIG. 9 is a block diagram of an example computing environment suitable for use in implementing an embodiment of the present disclosure.
Figure 10:
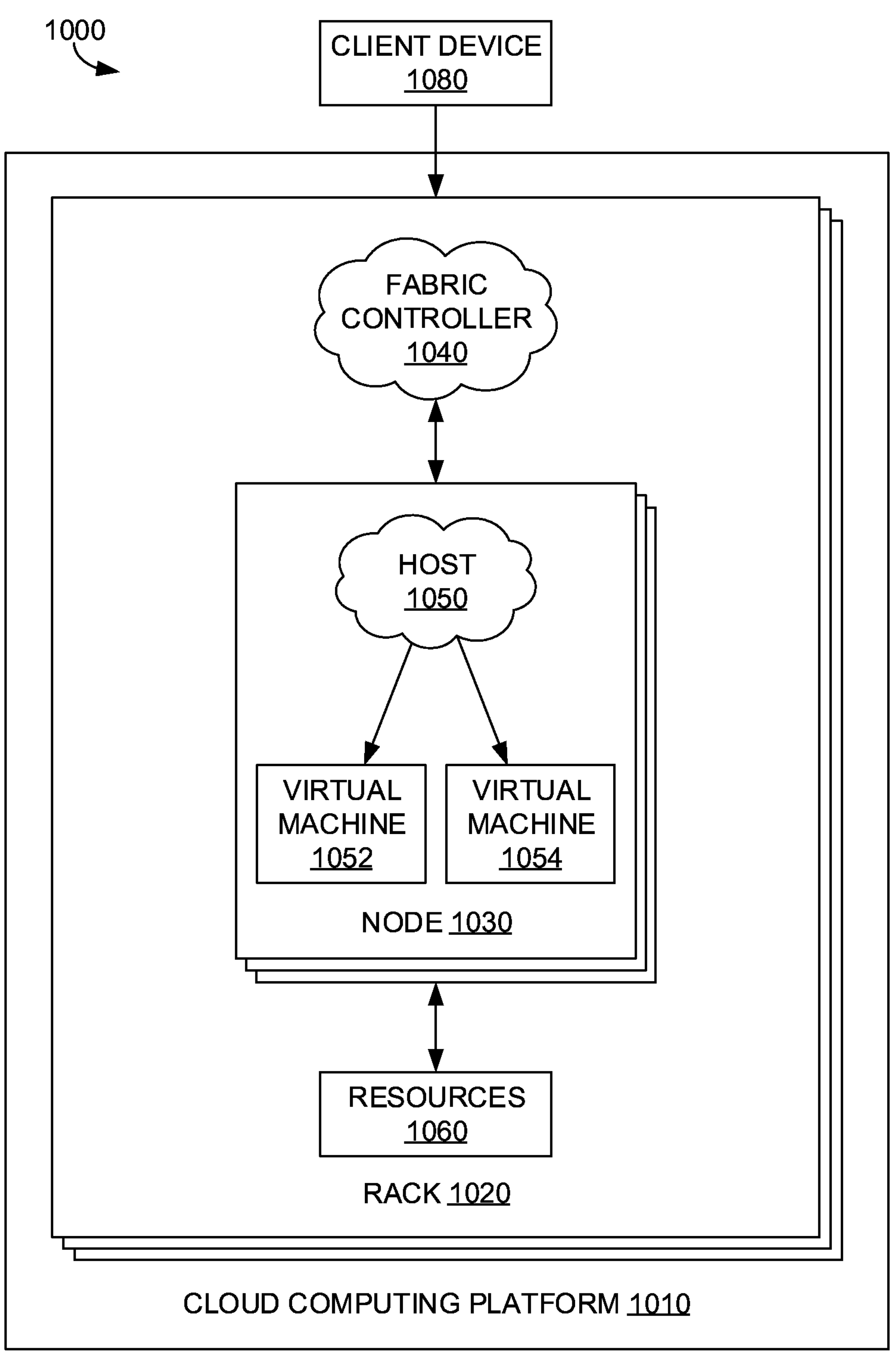
FIG. 10 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software such as application software, and any combination thereof. In this regard, the system components can manage resources and provide services for system functionality. Any other variations and combinations thereof are contemplated with the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 9 is merely illustrative of an example computing device that can be used in connection with one or more embodiments of the present disclosure. Distinction is not made between such categories as "workstation," "server," "laptop," or "hand-held device," as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Hardware devices include, for example, solid-state memory, hard drives, and optical-disc drives. Computing device 900 includes one or more processors 914 that read data from various entities such as memory 912 or I/O components 920. As used herein, the term processor or "a processer" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by processor may be performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, or a wireless device. The I/O components 920 may provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Referring now to FIG. 10, an example distributed computing environment 1000 is illustratively provided, in which implementations of the present disclosure may be employed. In particular, FIG. 10 shows a high level architecture of an example cloud computing platform 1010 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. Cloud computing platform 1010 can implement fabric controller 1040 component for provisioning and managing resource allocation, deployment, upgrade, and management of cloud services. Typically, cloud computing platform 1010 acts to store data or run service applications in a distributed manner Cloud computing platform 1010 in a data center can be configured to host and support operation of endpoints of a particular service application. Cloud computing platform 1010 may be a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms "service application," "application," or "service" are used interchangeably with regards to FIG. 10, and broadly refer to any software, or portions of software, that run on top of, or access storage and computing device locations within, a datacenter.

When more than one separate service application is being supported by nodes 1030, nodes 1030 may be partitioned into virtual machines (for example, virtual machine 1052 and virtual machine 1054). Physical machines can also concurrently run separate service applications. The virtual machines or physical machines can be configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

Client device 1080 may be linked to a service application in cloud computing platform 1010. Client device 1080 may be any type of computing device, such as user device **102*n* described with reference to FIG. 1, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. The components of cloud computing platform 1010** may communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (e.g., computer devices), physical and/or logical addresses, graph nodes, graph edges, functionalities, and the like. As used herein a set may include N elements, where N is any positive integer. That is, a set may include 1, 2, 3, . . . N objects and/or elements, where N is a positive integer with no upper bound. Therefore, as used herein, a set does not include a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. The objects included in some sets may be discrete objects (e.g., the set of natural numbers N). The objects included in other sets may be continuous objects (e.g., the set of real numbers Ilk). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system comprising:

at least one processor; and computer memory having computer-readable instructions embodied thereon, that, when executed by the at least one processor, perform operations comprising:

receiving user-meeting data associated with a meeting recording of a meeting;

determining at least one meeting data feature from the user-meeting data;

based at least in part on the at least one meeting data feature, automatically determining at least one event of interest of the meeting recording specific to a user by identifying topics or keywords associated with the at least one event of interest in contextual information of the user, the contextual information including email, calendar data, or browsing activity associated with the user;

determining an event time indicating a time in the meeting recording the at least one event of interest occurred; and generating, for presentation via a graphical user interface (GUI), a personalized enriched meeting playback timeline that comprises multiple timelines that each correspond to an event of interest category, the multiple timelines including a timeline corresponding to a category of the at least one event of interest, wherein a graphical depiction representing the at least one event of interest is located on the timeline at a position corresponding to the event time and the graphical depiction is selectable to cause the GUI to toggle presentation of the meeting recording to the event time.

2. The system of claim 1, wherein the at least one meeting data feature comprises at least one of: a user annotation to the meeting recording; a user input into a chat field in an application associated with the meeting, the user input indicating an event of interest and comprising a word, phrase, letter, or symbol that is uttered by the user or entered into the chat field; meeting transcript content, an identity of a speaker in the meeting recording, a duration of the meeting recording; a duration of pauses in the meeting recording; a verbal command uttered during the meeting or while watching the meeting recording, or contextual metadata expressed as data features indicative of meeting invitees, meeting attendees, action items, or a type of meeting.

3. The system of claim 1, wherein the enriched meeting playback timeline is expandable to present a plurality of enriched meeting playback sub-timelines, each enriched meeting playback sub-timeline of the plurality of enriched meeting playback sub-timelines corresponding to a particular meeting feature of the at least one meeting features.

4. The system of claim 1, wherein the operations further comprise, in response to a selection of or a hovering selection over the graphical depiction representing the at least one event of interest, presenting a pop-up window proximate to the graphical depiction representing the at least one event of interest on the enriched meeting playback timeline, the pop-up window comprising a description of the at least one event of interest.

5. The system of claim 1:

wherein the enriched meeting playback timeline comprises a plurality of segments, each segment of the plurality of segments corresponding to a portion of the meeting recording during which a corresponding speaker was speaking or during which a corresponding topic was covered; and wherein the enriched meeting playback timeline is expandable to present a plurality of enriched meeting playback sub-timelines, each enriched meeting playback sub-timeline of the plurality of enriched meeting playback sub-timelines corresponding to a different segment of the plurality of segments, wherein at least two segments of the plurality of segments are visually distinct from one another.

6. The system of claim 1, wherein determining the at least one event of interest comprises:

detecting an initial marking or wake-word provided by the user as user input and indicating an intent to designate an event of interest, wherein the event time corresponds to a time when the initial marking or wake-word is detected; and determining the at least one event of interest by analyzing the time in the meeting preceding or following the user input to detect the event of interest.

7. The system of claim 1, wherein the operations further comprise:

generating an abbreviated meeting recording that includes, for each of the at least one event of interest of the meeting recording, a portion of the meeting recording occurring at a time of the event of interest; and causing the abbreviated meeting recording to be provided thereby enabling the user to view only the portions of the meeting occurring at times of each of the at least one event of interest.

8. The system of claim 1, wherein the at least one event of interest comprises at least one of a mention of the user, a start of a session of a speaker, a keyword mention, or a question being asked by an attendee of the meeting; and wherein the at least one event of interest is determined automatically by detecting the mention of the user, the start of the session of the speaker, the keyword mention, the question being asked, or a marking or word indicative of a type of event of interest.

9. A computerized method, comprising:

receiving, from a computing device, a user request to access a meeting recording of a meeting;

receiving at least one user annotation to the meeting recording, each user annotation comprising a user input indicating a particular event of interest of the meeting recording, the input comprising a word, phrase, letter, or symbol;

determining an event of interest by analyzing a time in the meeting recording preceding or following when the at least one user annotation was received;

subsequent to receiving the user request and the at least one user annotation, presenting a graphical user interface (GUI) comprising a stream region and an enriched timeline region separate from the stream region, the enriched timeline region comprising multiple timelines that each correspond to an event of interest category, the multiple timelines including a timeline corresponding to a category of the at least one event of interest, wherein a first graphical depiction representing the event of interest is located on the timeline at a position corresponding to the event time;

receiving, via the GUI, a user selection of the first graphical depiction;

based on the user selection of the first graphical depiction, determining a time during which the determined event of interest occurred within the meeting recording; and changing content on the stream region to correspond to the time during which the determined event of interest occurred based on the first user input and the determined time.

10. The computerized method of claim 9, comprising:

receiving, via the GUI, a user selection of a second graphical depiction that is positioned proximate to the enriched timeline region and that is selectable to present a plurality of enriched meeting playback sub-timelines associated with the timeline; and changing content on the enriched timeline region to comprise the plurality of enriched meeting playback sub-timelines in response to receiving selection of the second indication, wherein each enriched meeting playback sub-timeline of the plurality of enriched meeting playback sub-timelines corresponds to a different speaker or a different topic.

11. The computerized method of claim 10, wherein at least one enriched meeting playback sub-timeline of the plurality of enriched meeting playback sub-timelines comprises a corresponding indication of an event of interest of a plurality of events of interest, wherein a meeting data feature is specific to the user and comprises at least one of: a user input into a chat field in an application associated with the meeting, meeting transcript content, an identity of a speaker in the meeting recording, a duration of the meeting recording, a duration of pauses in the meeting recording, a verbal command uttered during the meeting or while watching the meeting recording, or contextual metadata expressed as data features indicative of meeting invitees, meeting attendees, or a type of meeting.

12. The computerized method of claim 11, further comprising determining an event of interest of the plurality of events of interest based on a predictive model or a classification model, wherein the predictive model or the classification model determines the event of interest based on the at least one meeting data feature.

13. Computer storage media having computer-executable instructions embodied thereon, that, when executed by at least one computer processor, cause computing operations to be performed, comprising:

receiving user-meeting data associated with a meeting;

determining, from the user-meeting data, at least one meeting data feature that is specific to a user;

based at least on the at least one meeting data feature, automatically determining at least one event of interest of the meeting specific to a user by identifying topics or keywords associated with the at least one event of interest in contextual information of the user, the contextual data comprising at least one of: a user activity pattern, user browsing activity, data from a user profile, previous recordings accessed by the user, a topic of interest to the user, or email or communication data received by the user;

determining an event time of the event of interest relative to a timing of the meeting; and generating, for presentation via a graphical user interface (GUI), a personalized enriched meeting playback timeline that comprises multiple timelines that each correspond to an event of interest category, the multiple timelines including a timeline corresponding to a category of the at least one event of interest, wherein a graphical depiction representing the at least one event of interest is located on the timeline at a position corresponding to the event time and the graphical depiction is selectable to cause the GUI to navigate presentation of the meeting to a time corresponding to occurrence of the event of interest.

14. The computer storage media of claim 13, wherein determining the at least one event of interest comprises:

detecting an initial marking or wake-word, wherein the event time corresponds to a time when the initial marking or wake-word is detected;

entering a monitoring mode of operation based on the detection of the initial marking or wake-word; and detecting a subsequent marking or word indicative of a category of event of interest during the monitoring mode of operation, wherein the indication corresponding to the at least one event of interest is generated based on the subsequent marking or word indicative of the category of event of interest.

15. The computer storage media of claim 13, wherein the enriched meeting playback timeline is expandable to present a plurality of enriched meeting playback sub-timelines that includes an indexed version of information included in the enriched meeting playback timeline, each enriched meeting playback sub-timeline, of the plurality of enriched meeting playback sub-timelines, indicating a category of event of interest that is different than the other enriched meeting playback sub-timelines.

16. The computer storage media of claim 13, wherein the enriched meeting playback timeline comprises a plurality of segments, each segment of the plurality of segments corresponding to a portion of the meeting during which a corresponding speaker was speaking or during which a corresponding topic was covered.

17. The system of claim 1, wherein determining the at least one event of interest comprises:

analyzing the contextual information to identify a topic of relevance to the user;

automatically identifying portions of the meeting recording that relate to the identified topic of relevance; and determining the identified portions as events of interest specific to the user.

18. The computerized method of claim 9, wherein the event of interest is further determined based on the user input comprising the word, phrase, letter, or symbol.

19. The computerized method of claim 9, further comprising:

determining, based on the at least one user annotation, a type of event of interest indicated by the at least one user annotation;

analyzing the meeting recording to identify additional occurrences of the type of event of interest; and wherein the timeline comprises a plurality of indications, each indication corresponding to an identified occurrence of the type of event of interest in the meeting recording.

20. The computer storage media of claim 13, the operations further comprising:

in response to a selection event or a hovering event of the graphical depiction representing the at least one event of interest, presenting a description of the at least one event of interest.

21. The computer storage media of claim 13, wherein the at least one event of interest is ranked based on the user-meeting data and a user profile of the user.

* * * * *